(12) United States Patent
Liu et al.

(10) Patent No.: US 12,342,340 B2
(45) Date of Patent: Jun. 24, 2025

(54) METHOD AND DEVICE FOR NODE USED FOR WIRELESS COMMUNICATION

(71) Applicant: Quectel Wireless Solutions Co., Ltd., Shanghai (CN)

(72) Inventors: Zheng Liu, Shanghai (CN); Zhongzhi Yang, Shanghai (CN)

(73) Assignee: Quectel Wireless Solutions Co., Ltd., Shanghai (CN)

( * ) Notice: Subject to any disclaimer, the term of this patent is extended or adjusted under 35 U.S.C. 154(b) by 497 days.

(21) Appl. No.: 17/955,851

(22) Filed: Sep. 29, 2022

(65) Prior Publication Data

US 2023/0023017 A1 Jan. 26, 2023

Related U.S. Application Data

(63) Continuation of application No. PCT/CN2021/085820, filed on Apr. 7, 2021.

(30) Foreign Application Priority Data

Apr. 8, 2020 (CN) .......................... 202010271739.1

(51) Int. Cl.
  *H04W 72/1273* (2023.01)
  *H04W 24/08* (2009.01)
(52) U.S. Cl.
  CPC ....... *H04W 72/1273* (2013.01); *H04W 24/08* (2013.01)
(58) Field of Classification Search
  None
  See application file for complete search history.

(56) References Cited

U.S. PATENT DOCUMENTS

2018/0098318 A1    4/2018  Han et al.
2020/0389874 A1*  12/2020  Lin ...................... H04L 5/0096
(Continued)

FOREIGN PATENT DOCUMENTS

CN    104823475 A    8/2015
CN    110784290 A    2/2020
(Continued)

OTHER PUBLICATIONS

3rd Generation Partnership Project; Technical Specification Group Radio Access Network; NR; Physical layer procedures for control (Release 16), 3GPP Standard, Technical Specification; 3GPP TS 38.213, Mobile Competence Center, France, vol. RAN WG1, No. V16.1.0, dated Apr. 3, 2020.
(Continued)

*Primary Examiner* — Jamaal Henson
(74) *Attorney, Agent, or Firm* — Westbridge IP LLC

(57) ABSTRACT

Disclosed are a method and a device for a node used for wireless communication. The node receives a first information block and a second information block, the first information block and the second information block indicate a scheduled cell set and M PDCCK candidates respectively. M1 PDCCH candidates are monitored in a first time window, the M1 PDCCH candidates occupy M2 non-overlapped CCEs. A first threshold and a second threshold are used to determine the M1 PDCCH candidates. The scheduled cell set is divided into a first cell group and a second cell group, a control resource pool in a scheduling cell of a first serving cell is used to determine whether belongs to the first cell group or the second cell group.

11 Claims, 6 Drawing Sheets

(56) References Cited

U.S. PATENT DOCUMENTS

| | | | | |
|---|---|---|---|---|
| 2021/0144599 | A1* | 5/2021 | Awoniyi-Oteri | H04L 5/0053 |
| 2021/0144746 | A1* | 5/2021 | Ji | H04L 5/0053 |
| 2022/0294578 | A1* | 9/2022 | Kim | H04L 5/0035 |
| 2022/0295319 | A1* | 9/2022 | Lin | H04W 24/08 |

FOREIGN PATENT DOCUMENTS

| | | |
|---|---|---|
| CN | 110830216 A | 2/2020 |
| CN | 110876128 A | 3/2020 |
| CN | 110933748 A | 3/2020 |
| CN | 112437488 A | 3/2021 |
| WO | 2018157714 A1 | 9/2018 |

OTHER PUBLICATIONS

Extended European Search Report issued in counterpart European Patent Application No. 21784678.1, dated Jul. 5, 2023.

Quectel, Remaining issues on PDCCH Enhancements for Rel-16 URLLC, 3GPP Draft; R1-2006549, Mobile Competence Center, France, vol. RAN WG1, No. e-Meeting; Aug. 17, 2020-Aug. 28, 2020, dated Aug. 7, 2020.

Samsung, Correction on NR-DC and on Cross-carrier Scheduling with Different Numerologies, 3GPP Draft; RP-200194, Mobile Competence Center, France, vol. RAN WG1, No. e-Meeting; Feb. 24, 2020-Mar. 6, 2020, dated Mar. 11, 2020.

3rd Generation Partnership Project, NR, Physical layer procedures for control (Release 15), 3GPP Standard, Technical Specification, 3GPP TS 38.213, France, dated Oct. 31, 2019.

Vivo, Discussion and Decision on Remaining issues on cross-carrier scheduling with mix numerologies, R1-2000350, 3GPP TSG-RAN WG1 Meeting #100, dated Mar 6, 2020.

First Office Action issued in counterpart Chinese Patent Application No. 202010271739.1, dated Aug. 26, 2021.

International Search Report issued in corresponding PCT Application No. PCT/CN2021/085820, dated Jun. 24, 2021.

Second Office Action issued in counterpart Chinese Patent Application No. 202010271739.1, dated Nov. 11, 2021.

Vivo, Remaining issued on PDCCH search space, 3GPP TSG RAN WG1 Meeting #92bis R1-1803828, Sanya, China, dated Apr. 20, 2018.

Written Opinion issued in corresponding PCT Application No. PCT/CN2021/085820, dated Jun. 24, 2021.

\* cited by examiner

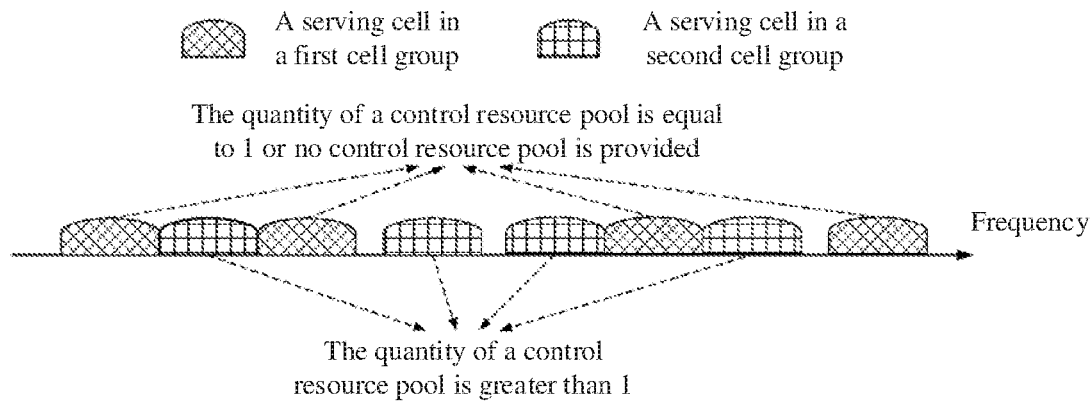
FIG. 6
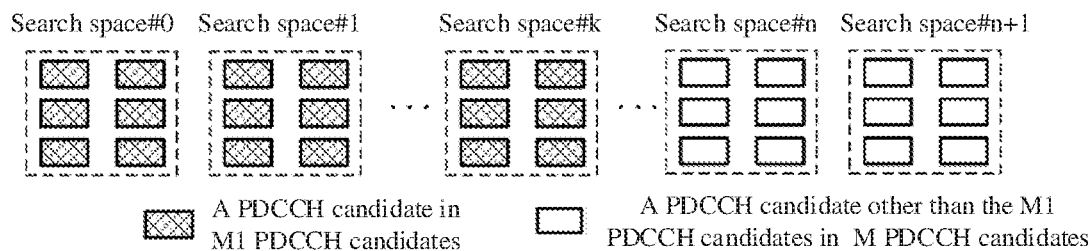
FIG. 7
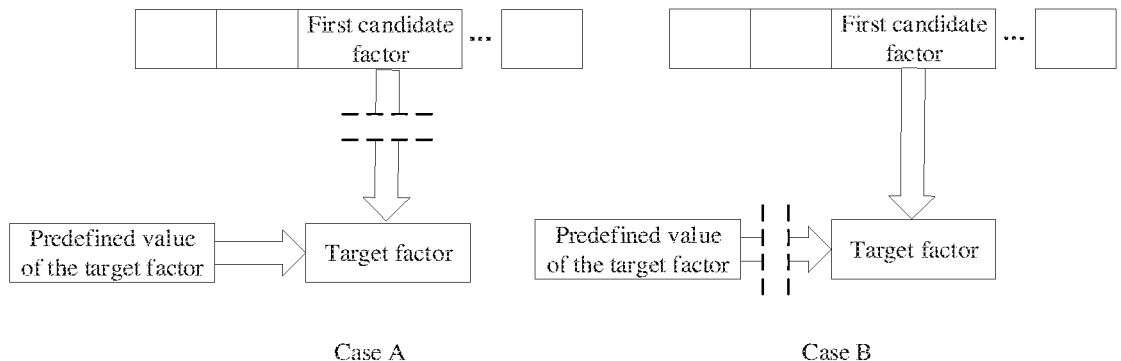
FIG. 8
$$\frac{\text{Target sum value}=N_{1,\mu}+\gamma\cdot N_{2,\mu}}{\text{Feature sum value}=N_1+\gamma\cdot N_2} \Rightarrow \boxed{\text{First parameter}}$$
FIG. 9

$N_{1,cap} + \gamma \cdot N_{2,cap}$ ⇒ Second parameter
FIG. 10
| Subcarrier spacing index | First-type candidate parameter | Second-type candidate parameter |
|---|---|---|
| 0 | 44 | 56 |
| 1 | 36 | 56 |
| 2 | 22 | 48 |
| 3 | 20 | 32 |
FIG. 11
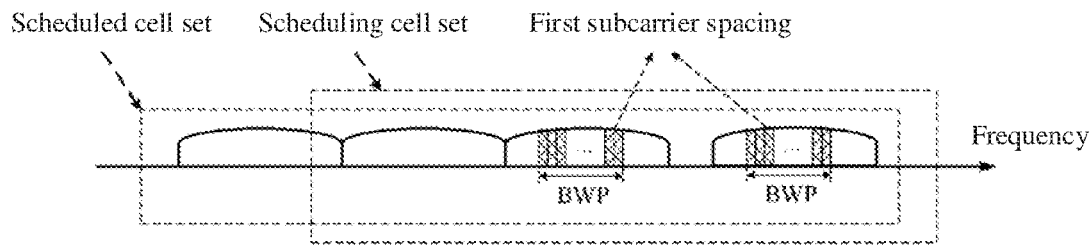
FIG. 12
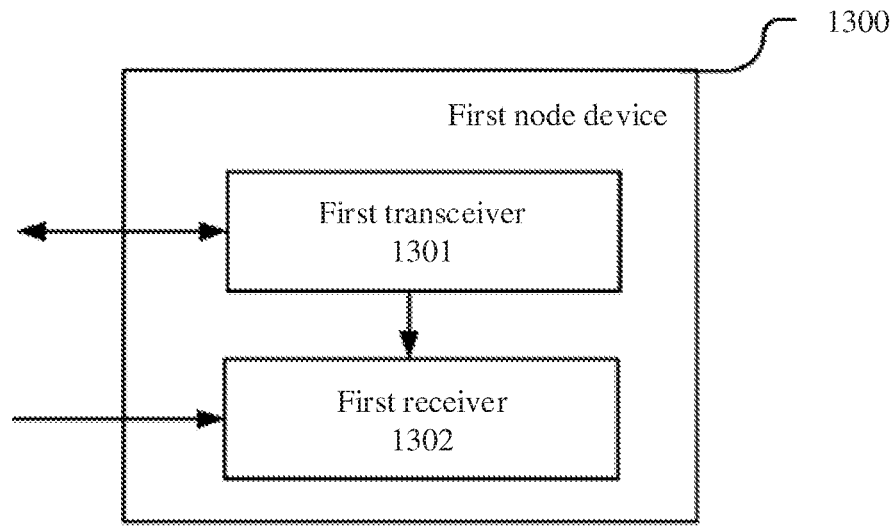
FIG. 13

METHOD AND DEVICE FOR NODE USED FOR WIRELESS COMMUNICATION

CROSS-REFERENCE TO RELATED APPLICATIONS

This application is a continuation of International Application No. PCT/CN2021/085820, filed on Apr. 7, 2021, which claims priority to Chinese Patent Application No. 202010271739.1, filed on Apr. 8, 2020. The disclosures of the aforementioned applications are hereby incorporated by reference in their entireties.

TECHNICAL FIELD

The present application relates to a transmission method and a device in wireless communication systems, and in particular, to a transmission method and a device for cross-carrier scheduling in wireless communication.

BACKGROUND

Application scenarios of a future wireless communication system are increasingly diversified, and different application scenarios impose different performance requirements on systems. To meet different performance requirements of various application scenarios, in a 3rd Generation Partnership Project (3GPP) Radio Access Network (RAN) #72 plenary conference. New Radio (NR) (or 5G) technology was decided to be studied; and in a 3GPP RAN #75 plenary conference, a Work Item (WI) of New Radio (NR) was approved and a standardization of NR was started. In a 3GPPRAN #83 plenary conference, a Study Item (SI) and a Work Item (WI) of Release 16 (R16) of NR were approved, including a work item of multi-RAT dual-connectivity and carrier aggregation enhancements. In addition, a work item of an enhancement to multi-antenna technology was also approved.

SUMMARY

Cross-carrier scheduling is a very important technical component in Carrier Aggregation (CA). To support a multiple Transmission Reception Point (TRP) transmission and a multi-panel transmission, a quantity of Physical Downlink Control Channel (PDCCH) and a quantity of non-overlapped Control Channel Element (CCE) that can be monitored by a user equipment need to be increased. When the cross-carrier scheduling and the multiple TRPs are used simultaneously, design of the PDCCH needs to be enhanced.

The present application discloses a solution to a problem of supporting combined use of a multiple TRP transmission, a multi-panel transmission, and cross-carrier scheduling. It should be noted that, embodiments and features in the embodiments in a first node device of the present application may be applied to a second node device in case of no conflict, and vice versa.

The present application discloses a method for a first node used for wireless communication, including: receiving a first information block and a second information block, where the first information block is used to determine a scheduled cell set, the scheduled cell set includes an integer quantity of serving cells greater than 1, and the second information block is used to determine M PDCCH candidates, where M is a positive integer greater than 1; and monitoring M1 PDCCH candidates in a first time window, where the M1 PDCCH candidates occupy M2 non-overlapped CCEs, M1 is a positive integer greater than 1, M1 is not greater than M, any one of the M1 PDCCH candidates is one of the M PDCCH candidates, and M2 is a positive integer greater than 1.

A first threshold and a second threshold are used to determine the M1 PDCCH candidates from the M PDCCH candidates, the first threshold is a positive integer, and the second threshold is a positive integer. Serving cells included in the scheduled cell set are divided into a first cell group and a second cell group. A first serving cell is a serving cell included in the scheduled cell set, and a quantity of a control resource pool in a scheduling cell of the first serving cell is used to determine whether the first serving cell belongs to the first cell group or the second cell group. A first quantity value and a second quantity value are quantities of serving cells associated with at least one of the M1 PDCCH candidates that are included in the first cell group and the second cell group respectively. The first quantity value, the second quantity value, and a target factor are used together to determine the first threshold and the second threshold, and the target factor is a positive number. A subcarrier spacing of a subcarrier occupied by one non-overlapped CCE of the M2 non-overlapped CCEs in frequency domain is equal to a first subcarrier spacing, and the first subcarrier spacing is used to determine a time length of the first time window.

According to an aspect of the present application, a characteristic of the foregoing method includes that: the first serving cell belongs to the first cell group when the quantity of the control resource pool provided in the scheduling cell of the first serving cell is equal to 1 or no control resource pool is provided in the scheduling cell of the first serving cell; and the first serving cell belongs to the second cell group when the quantity of the control resource pool provided in the scheduling cell of the first serving cell is greater than 1.

According to an aspect of the present application, a characteristic of the foregoing method includes that: M1 is equal to M when M is not greater than the first threshold and a quantity of a non-overlapped CCE occupied by the M PDCCH candidates is not greater than the second threshold; an index of a search space set to which the M PDCCH candidates belong is used to determine the M1 PDCCH candidates from the M PDCCH candidates when M is greater than the first threshold or the quantity of the non-overlapped CCE occupied by the M PDCCH candidates is greater than the second threshold.

According to an aspect of the present application, a characteristic of the foregoing method includes:
 sending a third information block; and
 receiving a fourth information block.

The third information block is used to indicate a first candidate factor in a first candidate factor set, and the first candidate factor set includes a positive integer quantity of candidate factors greater than 1. The first candidate factor is a candidate factor included in the first candidate factor set, and any candidate factor included in the first candidate factor set is greater than 0. The fourth information block is used to determine whether the target factor is equal to the first candidate factor. The target factor is equal to a predefined value when the target factor is not equal to the first candidate factor.

According to an aspect of the present application, a characteristic of the foregoing method includes that: a first parameter and a second parameter are used together to determine the first threshold and the second threshold, and the second parameter is a positive integer; the first parameter is equal to a ratio of a target sum value to a feature sum value, and the target sum value is not greater than the feature sum value; the feature sum value is linearly related to a quantity of serving cells associated with at least one PDCCH candidate that are included in the first cell group, and the feature sum value is linearly related to a product of the target factor and a quantity of serving cells associated with at least one PDCCH candidate that are included in the second cell group; and the target sum value is linearly related to the first quantity value, and the target sum value is linearly related to a product of the second quantity value and the target factor.

According to an aspect of the present application, a characteristic of the foregoing method includes:

sending a fifth information block.

The fifth information block is used to indicate the second parameter.

Alternatively, the second parameter is linearly related to a quantity of serving cells included in the first cell group, and the second parameter is linearly related to a product of the target factor and a quantity of serving cells included in the second cell group.

According to an aspect of the present application, a characteristic of the foregoing method includes that: the first subcarrier spacing is a candidate subcarrier spacing in X candidate subcarrier spacings, and X is a positive integer greater than 1; the X candidate subcarrier spacings are in a one-to-one correspondence with X first-type candidate parameters respectively, any one of the X first-type candidate parameters is a positive integer, the X candidate subcarrier spacings are in a one-to-one correspondence with X second-type candidate parameters respectively, and any one of the X second-type candidate parameters is a positive integer; a third parameter is a first-type candidate parameter of the X first-type candidate parameters, and the third parameter is used to determine the first threshold; a fourth parameter is a second-type candidate parameter of the X second-type candidate parameters, and the fourth parameter is used to determine the second threshold; and the first subcarrier spacing is used to determine the third parameter from the X first-type candidate parameters, and the first subcarrier spacing is used to determine the fourth parameter from the X second-type candidate parameters.

According to an aspect of the present application, a characteristic of the foregoing method includes that: a scheduling cell set includes a scheduling cell of serving cells included in the scheduled cell set, and the scheduling cell set includes a positive integer quantity of serving cells; the M1 PDCCH candidates are monitored in a Bandwidth Part (BWP) included in a first BWP set, and the first BWP set includes a positive integer quantity of BWPs; a serving cell to which any BWP included in the first BWP set belongs in frequency domain belongs to the scheduling cell set; and a subcarrier spacing of a subcarrier included in any BWP that is included in the first BWP set is equal to the first subcarrier spacing.

The present application discloses a method for a second node used for wireless communication, including:

sending a first information block and a second information block, where the first information block is used to indicate a scheduled cell set, the scheduled cell set includes an integer quantity of serving cells greater than 1, and the second information block is used to indicate M PDCCH candidates, where M is a positive integer greater than 1; and determining M1 PDCCH candidates in a first time window, where the M1 PDCCH candidates occupy M2 non-overlapped CCEs, M1 is a positive integer greater than 1, M1 is not greater than M, any one of the M1 PDCCH candidates is one of the M PDCCH candidates, and M2 is a positive integer greater than 1.

A first threshold and a second threshold are used to determine the M1 PDCCH candidates from the M PDCCH candidates, the first threshold is a positive integer, and the second threshold is a positive integer; serving cells included in the scheduled cell set are divided into a first cell group and a second cell group, a first serving cell is a serving cell included in the scheduled cell set, and a quantity of a control resource pool in a scheduling cell of the first serving cell is used to determine whether the first serving cell belongs to the first cell group or the second cell group. A first quantity value and a second quantity value are quantities of serving cells associated with at least one of the M1 PDCCH candidates that are included in the first cell group and the second cell group respectively. The first quantity value, the second quantity value, and a target factor are used together to determine the first threshold and the second threshold, and the target factor is a positive number. A subcarrier spacing of a subcarrier occupied by one non-overlapped CCE of the M2 non-overlapped CCEs in frequency domain is equal to a first subcarrier spacing, and the first subcarrier spacing is used to determine a time length of the first time window.

According to an aspect of the present application, a characteristic of the foregoing method includes that: the first serving cell belongs to the first cell group when the quantity of the control resource pool provided in the scheduling cell of the first serving cell is equal to 1 or no control resource pool is provided in the scheduling cell of the first serving cell; and the first serving cell belongs to the second cell group when the quantity of the control resource pool provided in the scheduling cell of the first serving cell is greater than 1.

According to an aspect of the present application, a characteristic of the foregoing method includes that: M1 is equal to M when M is not greater than the first threshold and a quantity of a non-overlapped CCE occupied by the M PDCCH candidates is not greater than the second threshold; an index of a search space set to which the M PDCCH candidates belong is used to determine the M1 PDCCH candidates from the M PDCCH candidates when M is greater than the first threshold or the quantity of the non-overlapped CCE occupied by the M PDCCH candidates is greater than the second threshold.

According to an aspect of the present application, a characteristic of the foregoing method includes:

receiving a third information block; and sending a fourth information block.

The third information block is used to indicate a first candidate factor in a first candidate factor set, and the first candidate factor set includes a positive integer quantity of candidate factors greater than 1. The first candidate factor is a candidate factor included in the first candidate factor set, and any candidate factor included in the first candidate factor set is greater than 0. The fourth information block is used to determine whether the target factor is equal to the first candidate factor. The target factor is equal to a predefined value when the target factor is not equal to the first candidate factor.

According to an aspect of the present application, a characteristic of the foregoing method includes that: a first parameter and a second parameter are used together to determine the first threshold and the second threshold, and the second parameter is a positive integer; the first parameter is equal to a ratio of a target sum value to a feature sum value, and the target sum value is not greater than the feature sum value; the feature sum value is linearly related to a quantity of serving cells associated with at least one PDCCH candidate that are included in the first cell group, and the feature sum value is linearly related to a product of the target factor and a quantity of serving cells associated with at least one PDCCH candidate that are included in the second cell group; and the target sum value is linearly related to the first quantity value, and the target sum value is linearly related to a product of the second quantity value and the target factor.

According to an aspect of the present application, a characteristic of the foregoing method includes: receiving a fifth information block.

The fifth information block is used to indicate the second parameter.

Alternatively, the second parameter is linearly related to a quantity of serving cells included in the first cell group, and the second parameter is linearly related to a product of the target factor and a quantity of serving cells included in the second cell group.

According to an aspect of the present application, a characteristic of the foregoing method includes that: the first subcarrier spacing is a candidate subcarrier spacing in X candidate subcarrier spacings, and X is a positive integer greater than 1; the X candidate subcarrier spacings are in a one-to-one correspondence with X first-type candidate parameters respectively, any one of the X first-type candidate parameters is a positive integer, the X candidate subcarrier spacings are in a one-to-one correspondence with X second-type candidate parameters respectively, and any one of the X second-type candidate parameters is a positive integer; a third parameter is a first-type candidate parameter of the X first-type candidate parameters, and the third parameter is used to determine the first threshold; a fourth parameter is a second-type candidate parameter of the X second-type candidate parameters, and the fourth parameter is used to determine the second threshold; and the first subcarrier spacing is used to determine the third parameter from the X first-type candidate parameters, and the first subcarrier spacing is used to determine the fourth parameter from the X second-type candidate parameters.

According to an aspect of the present application, a characteristic of the foregoing method includes that: a scheduling cell set includes a scheduling cell of serving cells included in the scheduled cell set, and the scheduling cell set includes a positive integer quantity of serving cells; the M1 PDCCH candidates are monitored in a BWP included in a first BWP set, and the first BWP set includes a positive integer quantity of BWPs; a serving cell to which any BWP included in the first BWP set belongs in frequency domain belongs to the scheduling cell set; and a subcarrier spacing of a subcarrier included in any BWP that is included in the first BWP set is equal to the first subcarrier spacing.

The present application discloses a first node device used for wireless communication, including:
a first transceiver, configured to receive a first information block and a second information block, where the first information block is used to determine a scheduled cell set, the scheduled cell set includes an integer quantity of serving cells greater than 1, and the second information block is used to determine M PDCCH candidates, where M is a positive integer greater than 1; and
a first receiver, configured to monitor M1 PDCCH candidates in a first time window, where the M1 PDCCH candidates occupy M2 non-overlapped CCEs, M1 is a positive integer greater than 1, M1 is not greater than M, any one of the M1 PDCCH candidates is one of the M PDCCH candidates, and M2 is a positive integer greater than 1.

A first threshold and a second threshold are used to determine the M1 PDCCH candidates from the M PDCCH candidates, the first threshold is a positive integer, and the second threshold is a positive integer. Serving cells included in the scheduled cell set are divided into a first cell group and a second cell group. A first serving cell is a serving cell included in the scheduled cell set, and a quantity of a control resource pool in a scheduling cell of the first serving cell is used to determine whether the first serving cell belongs to the first cell group or the second cell group. A first quantity value and a second quantity value are quantities of serving cells associated with at least one of the M1 PDCCH candidates that are included in the first cell group and the second cell group respectively. The first quantity value, the second quantity value, and a target factor are used together to determine the first threshold and the second threshold, and the target factor is a positive number. A subcarrier spacing of a subcarrier occupied by one non-overlapped CCE of the M2 non-overlapped CCEs in frequency domain is equal to a first subcarrier spacing, and the first subcarrier spacing is used to determine a time length of the first time window.

The present application discloses a second node device used for wireless communication, including:
a second transceiver, configured to send a first information block and a second information block, where the first information block is used to indicate a scheduled cell set, the scheduled cell set includes an integer quantity of serving cells greater than 1, and the second information block is used to indicate M PDCCH candidates, where M is a positive integer greater than 1; and
a first transmitter, configured to determine M1 PDCCH candidates in a first time window, where the M1 PDCCH candidates occupy M2 non-overlapped CCEs, M1 is a positive integer greater than 1, M1 is not greater than M, any one of the M1 PDCCH candidates is one of the M PDCCH candidates, and M2 is a positive integer greater than 1.

A first threshold and a second threshold are used to determine the M1 PDCCH candidates from the M PDCCH candidates, the first threshold is a positive integer, and the second threshold is a positive integer. Serving cells included in the scheduled cell set are divided into a first cell group and a second cell group. A first serving cell is a serving cell included in the scheduled cell set, and a quantity of a control resource pool in a scheduling cell of the first serving cell is used to determine whether the first serving cell belongs to the first cell group or the second cell group. A first quantity value and a second quantity value are quantities of serving cells associated with at least one of the M1 PDCCH candidates that are included in the first cell group and the second cell group respectively. The first quantity value, the second quantity value, and a target factor are used together to determine the first threshold and the second threshold, and the target factor is a positive number. A subcarrier spacing of a subcarrier occupied by one non-overlapped CCE of the M2 non-overlapped CCEs in frequency domain is equal to a first subcarrier spacing, and the first subcarrier spacing is used to determine a time length of the first time window.

In an embodiment, the methods in the present application have the following advantages.

According to the methods in the present application, serving cells are grouped by using a configuration parameter of a scheduling cell of the serving cells, and then a threshold for candidate dropping performed when PDCCHs are overbooking is calculated, which resolves a problem of a mismatch in quantities of PDCCH candidates during PDCCH candidate dropping due to different grouping methods caused when configuration parameters of a scheduling carrier and a scheduled carrier are different (for example, whether a multi-TRP transmission or a multi-panel transmission is supported) during cross-carrier scheduling, reducing a blocking probability of the PDCCH, and improving scheduling performance.

According to the methods in the present application, during monitoring of a PDCCH, occurrence of a problem that a PDCCH candidate and a non-overlapped CCE allocated for a scheduling cell exceed a PDCCH monitoring capability of the scheduling cell is avoided, ensuring correct reception of the PDCCH.

BRIEF DESCRIPTION OF THE DRAWINGS

Other features, objectives, and advantages of the present application will become more apparent upon reading the detailed description of the non-restrictive embodiments with reference to the accompanying drawings.

FIG. 6 is a schematic diagram of a first cell group and a second cell group according to an embodiment of the present application.

FIG. 7 is a schematic diagram of a relationship between M PDCCH candidates and M1 PDCCH candidates according to an embodiment of the present application.

FIG. 8 is a schematic diagram of a relationship between a first candidate factor and a target factor according to an embodiment of the present application.

FIG. 9 is a schematic diagram of a target sum value and a feature sum value according to an embodiment of the present application.

FIG. 10 is a schematic diagram of a second parameter according to an embodiment of the present application.

FIG. 11 is a schematic diagram of a relationship between a third parameter, a fourth parameter, and a first subcarrier spacing according to an embodiment of the present application.

FIG. 12 is a schematic diagram of BWPs in a first BWP set according to an embodiment of the present application.

FIG. 13 is a structural block diagram of a processing apparatus in a first node device according to an embodiment of the present application.

DETAILED DESCRIPTION OF THE EMBODIMENTS

The technical solutions of the present application are further described in detail below with reference to the accompanying drawings. It should be noted that, the embodiments of the present application and characteristics in the embodiments may be arbitrarily combined with each other in case of no conflict.

Embodiment 1

Figure 1:
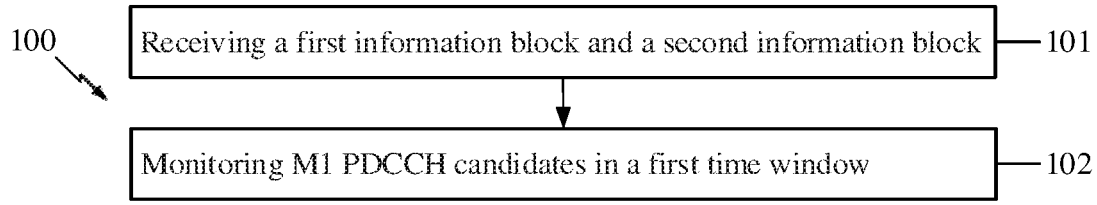
FIG. 1 is a flowchart of a first information block, a second information block, and M1 PDCCH candidates according to an embodiment of the present application.

Embodiment 1 illustrates a flowchart of a first information block, a second information block, and M1 PDCCH candidates according to an embodiment of the present application, as shown in FIG. 1. In FIG. 1, each block represents a step, and it should be emphasized that the sequence of each block in the figure does not represent a temporal sequence relationship between the represented steps.

In Embodiment 1, a first node device in the present application receives a first information block and a second information block in step 101. The first information block is used to determine a scheduled cell set, and the scheduled cell set includes an integer quantity of serving cells greater than 1. The second information block is used to determine M PDCCH candidates, where M is a positive integer greater than 1. The first node device in the present application monitors M1 PDCCH candidates in a first time window in step 102. The M1 PDCCH candidates occupy M2 non-overlapped CCEs, where M1 is a positive integer greater than 1, and M1 is not greater than M. Any one of the M1 PDCCH candidates is one of the M PDCCH candidates, and M2 is a positive integer greater than 1. A first threshold and a second threshold are used to determine the M1 PDCCH candidates from the M PDCCH candidates, the first threshold is a positive integer, and the second threshold is a positive integer. Serving cells included in the scheduled cell set are divided into a first cell group and a second cell group, a first serving cell is a serving cell included in the scheduled cell set, and a quantity of a control resource pool in a scheduling cell of the first serving cell is used to determine whether the first serving cell belongs to the first cell group or the second cell group. A first quantity value and a second quantity value are quantities of serving cells associated with at least one of the M1 PDCCH candidates that are included in the first cell group and the second cell group respectively. The first quantity value, the second quantity value, and a target factor are used together to determine the first threshold and the second threshold, where the target factor is a positive number. A subcarrier spacing of a subcarrier occupied by one non-overlapped CCE of the M2 non-overlapped CCEs in frequency domain is equal to a first subcarrier spacing, and the first subcarrier spacing is used to determine a time length of the first time window.

In an embodiment, the first information block includes all or part of a higher-layer signaling.

In an embodiment, the first information block includes all or part of a physical layer signaling.

In an embodiment, the first information block includes all or part of an Radio Resource Control (RRC) signaling.

In an embodiment, the first information block is transmitted through a Physical Downlink Shared Channel (PDSCH).

In an embodiment, the first information block is User Equipment specific (UE-specific).

In an embodiment, the first information block is configured per serving cell.

In an embodiment, the first information block includes all or partial fields of a Downlink Control Information (DCI) signaling.

In an embodiment, the above phrase that "the first information block is used to determine a scheduled cell set" includes the following meaning: the first information block includes K1 sub-information blocks, and K1 is 1 smaller than a quantity of serving cells included in the scheduled cell set. The K1 sub-information blocks are used to determine K1 serving cells respectively, and any one of the K1 serving cells belongs to the scheduled cell set.

In an embodiment, the first information block includes a field "sCellToAddModList" in an Information Element (IE) "CellGroupConfig" in an RRC signaling.

In an embodiment, the first information block includes a field "sCellToReleaseList" in an IE "CellGroupConfig" in an RRC signaling.

In an embodiment, the above phrase that "the first information block is used to determine a scheduled cell set" includes the following meaning: the first information block includes K1 sub-information blocks, and K1 is 1 smaller than a quantity of serving cells included in the scheduled cell set. The K1 sub-information blocks are used to determine K1 serving cells respectively, any one of the K1 serving cells belongs to the scheduled cell set, and the K1 sub-information blocks include an IE "SCellConfig" in an RRC signaling.

In an embodiment, the above phrase that "the first information block is used to determine a scheduled cell set" includes the following meaning: the first information block is used by the first node device in the present application to determine the scheduled cell set.

In an embodiment, the above phrase that "the first information block is used to determine a scheduled cell set" includes the following meaning: the first information block is used to explicitly indicate the scheduled cell set.

In an embodiment, the above phrase that "the first information block is used to determine a scheduled cell set" includes the following meaning: the first information block is used to implicitly indicate the scheduled cell set.

In an embodiment, the second information block includes all or part of a higher-layer signaling.

In an embodiment, the second information block includes all or part of a physical layer signaling.

In an embodiment, the second information block includes all or part of an RRC signaling.

In an embodiment, the second information block is transmitted through a PDSCH.

In an embodiment, the second information block is UE-specific.

In an embodiment, the second information block is configured per serving cell.

In an embodiment, the second information block includes all or partial fields of an IE "SearchSpace" in an RRC signaling.

In an embodiment, the above phrase that "the second information block is used to determine M PDCCH candidates" includes the following meaning: the second information block is used by the first node device in the present application to determine the M PDCCH candidates.

In an embodiment, the above phrase that "the second information block is used to determine M PDCCH candidates" includes the following meaning: the second information block is used to explicitly indicate the M PDCCH candidates.

In an embodiment, the above phrase that "the second information block is used to determine M PDCCH candidates" includes the following meaning: the second information block is used to implicitly indicate the M PDCCH candidates.

In an embodiment, any two serving cells included in the scheduled cell set are different.

In an embodiment, each serving cell included in the scheduled cell set corresponds to a Component Carrier (CC).

In an embodiment, the scheduled cell set at least includes one Primary Cell (Pcell) and one Secondary Cell (Scell).

In an embodiment, all serving cells included in the scheduled cell set belong to a same Master Cell Group (MCG).

In an embodiment, all serving cells included in the scheduled cell set belong to a same Secondary Cell Group (SCG).

In an embodiment, the first time window is a slot.

In an embodiment, the first time window includes a positive integer quantity of Orthogonal Frequency Division Multiplexing (OFDM) symbols that are continuous in time domain.

In an embodiment, the first time window is a span.

In an embodiment, the first time window is a time interval with the smallest time interval length between the earliest OFDM symbols in two PDCCH occasions.

In an embodiment, monitoring of the M1 PDCCH candidates is implemented by decoding the M1 PDCCH candidates.

In an embodiment, monitoring of the M1 PDCCH candidates is implemented by performing decoding and a Cyclic Redundancy Check (CRC) on the M1 PDCCH candidates.

In an embodiment, any one of the M1 PDCCH candidates occupies a positive integer quantity of CCEs.

In an embodiment, any one of the M1 PDCCH candidates occupies one of 1 CCE, 2 CCEs, 4 CCEs, 8 CCEs, and 16 CCEs.

In an embodiment, any one of the M1 PDCCH candidates occupies a positive integer quantity of Resource Elements (REs) in time-frequency domain.

In an embodiment, any one of the M1 PDCCH candidates is a PDCCH candidate adopting one or more DCI payload sizes.

In an embodiment, the M1 PDCCH candidates include two PDCCH candidates occupying a same time-frequency resource.

In an embodiment, any two PDCCH candidates of the M1 PDCCH candidates occupy different CCEs.

In an embodiment, there are two PDCCH candidates of the M1 PDCCH candidates occupying a same CCE.

In an embodiment, any one of the M2 non-overlapped CCEs is occupied by at least one physical downlink PDCCH candidate.

In an embodiment, any one of the M1 PDCCH candidates occupies one or more non-overlapped CCEs of the M2 non-overlapped CCEs.

In an embodiment, two independent channel estimations are required for any two non-overlapped CCEs of the M2 non-overlapped CCEs.

In an embodiment, channel estimations for any two non-overlapped CCEs of the M2 non-overlapped CCEs cannot be reused.

In an embodiment, two independent channel equalizations are required for any two non-overlapped CCEs of the M2 non-overlapped CCEs.

In an embodiment, any one of the M2 non-overlapped CCEs includes six Resource Element Groups (REGs).

In an embodiment, any one of the M2 non-overlapped CCEs is occupied by at least one of the M1 PDCCH candidates.

In an embodiment, the M2 non-overlapped CCEs include all CCEs occupied by any one of the M1 PDCCH candidates.

In an embodiment, a subcarrier spacing of a subcarrier occupied by any one of the M2 non-overlapped CCEs in frequency domain is equal to a subcarrier spacing configured for an active BWP to which any one of the M2 non-overlapped CCEs belongs in frequency domain.

In an embodiment, a subcarrier spacing of any subcarrier occupied by any one of the M2 non-overlapped CCEs in frequency domain is equal to the first subcarrier spacing.

In an embodiment, the first subcarrier spacing is equal to one of 15 kHz, 30 kHz, 60 kHz, 120 kHz, and 240 kHz.

In an embodiment, the above phrase that "the first subcarrier spacing is used to determine a time length of the first time window" includes the following meaning: the first subcarrier spacing is used by the first node device in the present application to determine the time length of the first time window.

In an embodiment, the above phrase that "the first subcarrier spacing is used to determine a time length of the first time window" includes the following meaning: the first time window is a slot, the first subcarrier spacing is used to determine a quantity of slots included in one subframe, and the time length of the first time window is equal to a ratio of a length of one subframe to the quantity of slots included in one subframe.

In an embodiment, the above phrase that "the first subcarrier spacing is used to determine a time length of the first time window" includes the following meaning: the first subcarrier spacing is used to determine a time length of each OFDM symbol included in the first time window.

In an embodiment, the method further includes:
receiving a first synchronization signal, where
the first synchronization signal is used to determine a position of the first time window in time domain.

In an embodiment, M1 and M2 are not greater than the first threshold and the second threshold, respectively.

In an embodiment, the above phrase that "a first threshold and a second threshold are used to determine the M1 PDCCH candidates from the M PDCCH candidates" includes the following meaning: the first threshold and the second threshold are used by the first node device in the present application to determine the M1 PDCCH candidates from the M PDCCH candidates.

In an embodiment, the above phrase that "a first threshold and a second threshold are used to determine the M1 PDCCH candidates from the M PDCCH candidates" includes the following meaning: M1 and M2 are not greater than the first threshold and the second threshold, respectively.

In an embodiment, the above phrase that "a first threshold and a second threshold are used to determine the M1 PDCCH candidates from the M PDCCH candidates" includes the following meaning: M1 and M2 are not greater than the first threshold and the second threshold respectively, and the M PDCCH candidates are sequentially reduced to PDCCH candidates which is obtained in the case of a quantity of monitored PDCCH candidates is not greater than the first threshold and a quantity of monitored non-overlapped CCEs is not greater than the second threshold.

In an embodiment, the above phrase that "a first threshold and a second threshold are used to determine the M1 PDCCH candidates from the M PDCCH candidates" is implemented by Claim 3 in the present application.

In an embodiment, M1 is less than the first threshold.
In an embodiment, M1 is equal to the first threshold.
In an embodiment, M2 is less than the second threshold.
In an embodiment, M2 is equal to the second threshold.

In an embodiment, the first node device in the present application is not required to monitor, in an active bandwidth part adopting the first subcarrier spacing in the first time window, PDCCH candidates with a quantity greater than the first threshold.

In an embodiment, the first node device in the present application is not required to monitor, in an active bandwidth part adopting the first subcarrier spacing in the first time window, non-overlapped CCEs with a quantity greater than the second threshold.

In an embodiment, the first threshold is greater than 1.
In an embodiment, the second threshold is greater than 1.
In an embodiment, the first cell group includes a non-negative integer quantity of serving cells.
In an embodiment, the second cell group includes a non-negative integer quantity of serving cells.

In an embodiment, there is no serving cell belonging to both the first cell group and the second cell group in the scheduled cell set.

In an embodiment, the first serving cell may be any serving cell included in the scheduled cell set.

In an embodiment, the first serving cell is a given serving cell included in the scheduled cell set.

In an embodiment, a quantity of a scheduling cell of the first serving cell is equal to 1.

In an embodiment, a scheduling cell of the first serving cell is a serving cell that carries a PDCCH for scheduling the first serving cell.

In an embodiment, a scheduling cell of the first serving cell is a serving cell that carries a PDCCH for scheduling a signal in the first serving cell.

In an embodiment, "a control resource pool in a scheduling cell of the first serving cell" means a Control Resource Set (CORESET) pool in a scheduling cell of the first serving cell.

In an embodiment, "a control resource pool in a scheduling cell of the first serving cell" means a CORESET in a scheduling cell of the first serving cell.

In an embodiment, "a quantity of a control resource pool in a scheduling cell of the first serving cell" means a quantity of a CORESET pool index provided in a scheduling cell of the first serving cell.

In an embodiment, "a quantity of a control resource pool in a scheduling cell of the first serving cell" means a quantity of a CORESET index provided in a scheduling cell of the first serving cell.

In an embodiment, a quantity of a control resource pool in a scheduling cell of the first serving cell is equal to 1 or 2.

In an embodiment, the above phrase that "a quantity of a control resource pool in a scheduling cell of the first serving cell is used to determine whether the first serving cell belongs to the first cell group or the second cell group" includes the following meaning: the quantity of a control resource pool in a scheduling cell of the first serving cell is used by the first node device in the present application to determine whether the first serving cell belongs to the first cell group or the second cell group.

In an embodiment, the above phrase that "a quantity of a control resource pool in a scheduling cell of the first serving cell is used to determine whether the first serving cell belongs to the first cell group or the second cell group" includes the following meaning: the quantity of a control resource pool in a scheduling cell of the first serving cell is used according to a given judgment condition to determine whether the first serving cell belongs to the first cell group or the second cell group.

In an embodiment, the above phrase that "a quantity of a control resource pool in a scheduling cell of the first serving cell is used to determine whether the first serving cell belongs to the first cell group or the second cell group" includes the following meaning: the quantity of a control resource pool in a scheduling cell of the first serving cell is used according to a given mapping relationship to determine whether the first serving cell belongs to the first cell group or the second cell group.

In an embodiment, the above phrase that "a quantity of a control resource pool in a scheduling cell of the first serving cell is used to determine whether the first serving cell belongs to the first cell group or the second cell group" is implemented by Claim 2 in the present application.

In an embodiment, the first quantity value and the second quantity value are non-negative integers.

In an embodiment, the first quantity value and the second quantity value are positive integers.

In an embodiment, the target factor is not less than 1.

In an embodiment, the target factor may be less than 1.

In an embodiment, the target factor is not greater than 2.

In an embodiment, the target factor is equal to 1 or 2.

In an embodiment, the above phrase that "the first quantity value, the second quantity value, and a target factor are used together to determine the first threshold and the second threshold" includes the following meaning: the first quantity value, the second quantity value, and the target factor are used together by the first node device in the present application to determine the first threshold and the second threshold.

In an embodiment, the above phrase that "the first quantity value, the second quantity value, and a target factor are used together to determine the first threshold and the second threshold" includes the following meaning: the first quantity value, the second quantity value, and the target factor are used together according to a respectively given operational function to determine the first threshold and the second threshold.

In an embodiment, the above phrase that "the first quantity value, the second quantity value, and a target factor are used together to determine the first threshold and the second threshold" includes the following meaning: the first quantity value, the second quantity value, and the target factor are used together according to a respectively given mapping relationship to determine the first threshold and the second threshold.

In an embodiment, the above phrase that "the first quantity value, the second quantity value, and a target factor are used together to determine the first threshold and the second threshold" includes the following meaning: the first quantity value, the second quantity value, and the target factor are used together to determine the first parameter of the present application, and the first parameter is used to determine the first threshold and the second threshold.

Embodiment 2

Figure 2:
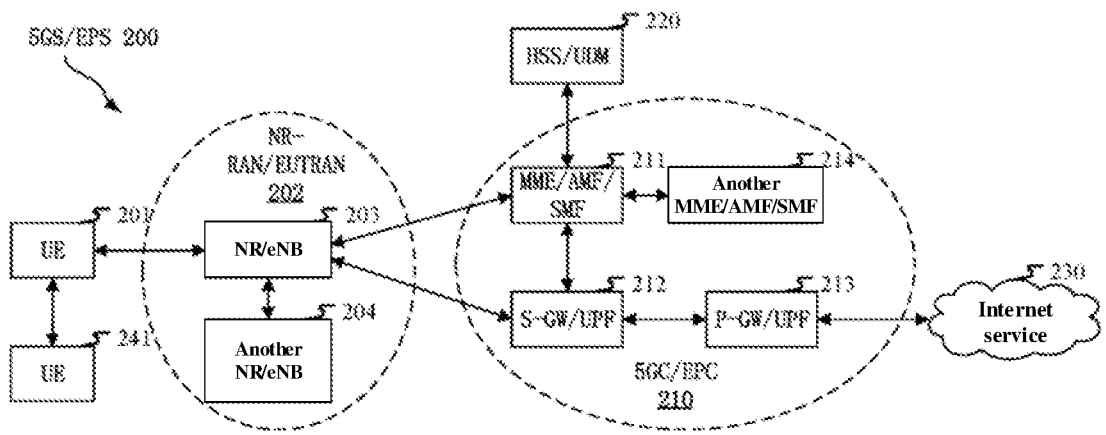
FIG. 2 is a schematic diagram of a network architecture according to an embodiment of the present application.

Embodiment 2 illustrates a schematic diagram of a network architecture according to the present application, as shown in FIG. 2. FIG. 2 shows a diagram of a network architecture 200 of a 5G NR system, a Long-Term Evolution (LTE) system, and a Long Term Evolution-Advanced (LTE-A) system. The 5G NR or LTE network architecture 200 may be referred to as a 5G System (5GS)/an Evolved Packet System (EPS) 200 or another suitable term. The 5GS/EPS 200 may include one or more User Equipments (UEs) 201, a Next-Generation Radio Access Network (NG-RAN) 202, a 5G Core Network (5GC)/an Evolved Packet Core (EPC) 210, a Home Subscriber Server (HSS)/Unified Data Management (UDM) 220, and an Internet service 230. The 5GS/EPS may interconnect with other access networks, but these entities/interfaces are not shown for simplicity. As shown in the figure, the 5GS/EPS provides a packet-switching service. However, those skilled in the art will readily understand that the various concepts presented throughout the present application may be extended to a network that provides a circuit-switching service or another cellular network. The NG-RAN may include an NR/Evolved node B (gNB/eNB) 203 and another gNB (eNB) 204. The gNB (eNB) 203 may provide UE 201-oriented user plane and control plane protocol terminations. The gNB (eNB) 203 may be connected to the another gNB (eNB) 204 via an Xn/X2 interface (for example, backhaul). The gNB (eNB) 203 may also be referred to as a base station, a base transceiver station, a radio base station, a radio transceiver, a transceiver function, a Basic Service Set (BSS), an Extended Service Set (ESS), a TRP or another suitable term. The gNB (eNB) 203 may provide the UE 201 with an access point to the 5GC/EPC 210. Examples of the UE 201 may include a cellular phone, a smart phone, a Session Initiation Protocol (SIP) phone, a laptop computer, a Personal Digital Assistant (PDA), satellite radio, non-terrestrial base station communication, satellite mobile communication, a global positioning system, a multimedia apparatus, a video apparatus, a digital audio player (such as an MP3 player), a camera, a game console, an unmanned air vehicle, an aircraft, a narrow band-internet of things device, a machine type communication device, a land vehicle, an automobile, a wearable device, or any other similar functional apparatuses. The UE 201 may also be referred, by a person skilled in the art, to as a mobile station, a subscriber station, a mobile unit, a subscriber unit, a wireless unit, a remote unit, a mobile apparatus, a wireless apparatus, a wireless communication apparatus, a remote apparatus, a mobile subscriber station, an access terminal, a mobile terminal, a wireless terminal, a remote terminal, a handset, a user agent, a mobile client, a client or another suitable term. The gNB (eNB) 203 is connected to the 5GC/EPC 210 via an S1/NG interface. The 5GC/EPC 210 may include a Mobility Management Entity (MME)/Authentication Management Field (AMF)/Session Management Function (SMF) 211, another MME/AMF/SMF 214, a Service Gateway (S-GW)/User Plane Function (UPF) 212, and a Packet Date Network Gateway (P-GW)/UPF 213. The MME/AMF/SMF 211 is a control node used for processing a signaling between the UE 201 and the 5GC/EPC 210. Generally, the MME/AMF/SMF 211 provides bearing and connection management. All user Internet Protocol (IP) packets are transmitted through the S-GW/UPF 212, and the S-GW/UPF 212 itself is connected to the P-GW/UPF 213. The P-GW provides UE IP address allocation and other functions. The P-GW/UPF 213 is connected to the Internet service 230. The Internet service 230 may include an Internet protocol service corresponding to an operator, and may specifically include an Internet service, an intranet service, an IP Multimedia Subsystem (IMS) service, and a packet switching streaming service.

In an embodiment, the UE 201 corresponds to the first node device in the present application.

In an embodiment, the UE 201 supports receiving of a multi-TRP transmission.

In an embodiment, the UE 201 supports a transmission of cross-carrier scheduling of a primary carrier by a secondary carrier.

In an embodiment, the gNB (eNB) 203 corresponds to the second node device in the present application.

In an embodiment, the gNB (eNB) 203 supports a multi-TRP transmission.

In an embodiment, the gNB (eNB) 203 supports a transmission of cross-carrier scheduling of a primary carrier by a secondary carrier.

Embodiment 3

Figure 3:
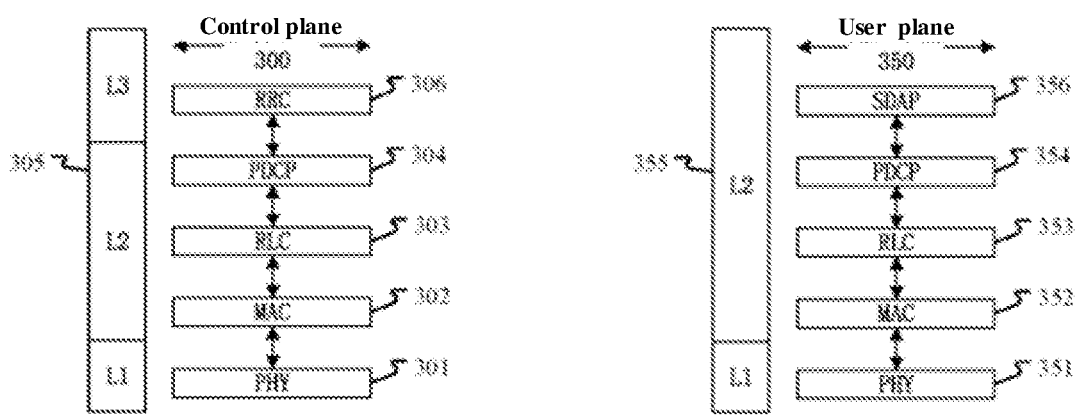
FIG. 3 is a schematic diagram of a radio protocol architecture of a user plane and a control plane according to an embodiment of the present application.

Embodiment 3 illustrates a schematic diagram of a radio protocol architecture of a user plane and a control plane according to an embodiment of the present application, as shown in FIG. 3. FIG. 3 is a schematic diagram illustrating an embodiment of a radio protocol architecture of a user plane 350 and a control plane 300. In FIG. 3, the radio protocol architecture of the control plane 300 used for a first node device (UE or gNB) and a second node device (gNB or UE) is represented by three layers, which are a layer 1, a layer 2 and a layer 3. Layer 1 (L1 layer) is the lowest layer, and various Physical Layer (PHY) signal processing functions are implemented at this layer. The L1 layer is referred to as PHY 301 herein. The layer 2 (L2 layer) 305 is above the PHY 301, and is responsible for a link between the first node device and the second node device via the PHY 301. The L2 layer 305 includes a Medium Access Control (MAC) sublayer 302, a Radio Link Control (RLC) sublayer 303 and a Packet Data Convergence Protocol (PDCP) sublayer 304, and these sublayers are terminated at the second node device. The PDCP sublayer 304 provides multiplexing between different radio bearers and logical channels. The PDCP sublayer 304 further provides security by encrypting a data packet, and provides handover support for the first node device between second node devices. The RLC sublayer 303 provides segmentation and reassembly of upper layer data packets, retransmission of a lost data packet, and reordering of data packets, to compensate for out-of-order reception due to Hybrid Automatic Repeat reQuest (HARQ). The MAC sublayer 302 provides multiplexing between a logical channel and a transport channel. The MAC sublayer 302 is further responsible for allocating, between first node devices, various radio resources (for example, resource blocks) in a cell. The MAC sublayer 302 is further responsible for a HARQ operation. A Radio Resource Control (RRC) sublayer 306 in the layer 3 (L3 layer) in the control plane 300 is responsible for obtaining a radio resource (namely, a radio bearer) and configuring a lower layer by using an RRC signaling between the second node device and the first node device. The radio protocol architecture of the user plane 350 includes layer 1 (L1 layer) and layer 2 (L2 layer). A PHY layer 351, a PDCP sublayer 354 in the L2 layer 355, an RLC sublayer 353 in the L2 layer 355, and a MAC sublayer 352 in the L2 layer 355 of the radio protocol architecture, used for the first node device and the second node device, in the user plane 350 are substantially the same as the corresponding layers and sublayers in the control plane 300, but the PDCP sublayer 354 further provides a header compression used for an upper layer data packet to reduce wireless transmission overheads. The L2 layer 355 in the user plane 350 further includes a Service Data Adaptation Protocol (SDAP) sublayer 356, which is responsible for mapping between a Quality of Service (QoS) flow and a Data Radio Bearer (DRB), to support service diversity. Although not shown in the figure, the first node device may be provided with several upper layers above the L2 layer 355, including a network layer (for example, an IP layer) terminated at the P-GW on the network side and an application layer terminated at the other end of the connection (for example, a remote UE, a server, etc.).

In an embodiment, the radio protocol architecture in FIG. 3 is applicable to the first node device in the present application.

In an embodiment, the radio protocol architecture in FIG. 3 is applicable to the second node device in the present application.

In an embodiment, the first information block in the present application is generated at the RRC sublayer 306.

In an embodiment, the first information block in the present application is generated at the MAC sublayer 302 or the MAC sublayer 352.

In an embodiment, the first information block in the present application is generated at the PHY 301 or the PHY 351.

In an embodiment, the second information block in the present application is generated at the RRC sublayer 306.

In an embodiment, the second information block in the present application is generated at the MAC sublayer 302 or the MAC sublayer 352.

In an embodiment, the second information block in the present application is generated at the PHY 301 or the PHY 351.

In an embodiment, the third information block in the present application is generated at the RRC sublayer 306.

In an embodiment, the third information block in the present application is generated at the MAC sublayer 302 or the MAC sublayer 352.

In an embodiment, the third information block in the present application is generated at the PHY 301 or the PHY 351.

In an embodiment, the fourth information block in the present application is generated at the RRC sublayer 306.

In an embodiment, the fourth information block in the present application is generated at the MAC sublayer 302 or the MAC sublayer 352.

In an embodiment, the fourth information block in the present application is generated at the PHY 301 or the PHY 351.

In an embodiment, the fourth information block in the present application is generated at the RRC sublayer 306.

In an embodiment, the fourth information block in the present application is generated at the MAC sublayer 302 or the MAC sublayer 352.

In an embodiment, the fourth information block in the present application is generated at the PHY 301 or the PHY 351.

In an embodiment, the fifth information block in the present application is generated at the sublayer RRC 306.

In an embodiment, the fifth information block in the present application is generated at the MAC sublayer 302 or the sublayer MAC 352.

In an embodiment, the fifth information block in the present application is generated at the PHY 301 or the PHY 351.

Embodiment 4

Figure 4:
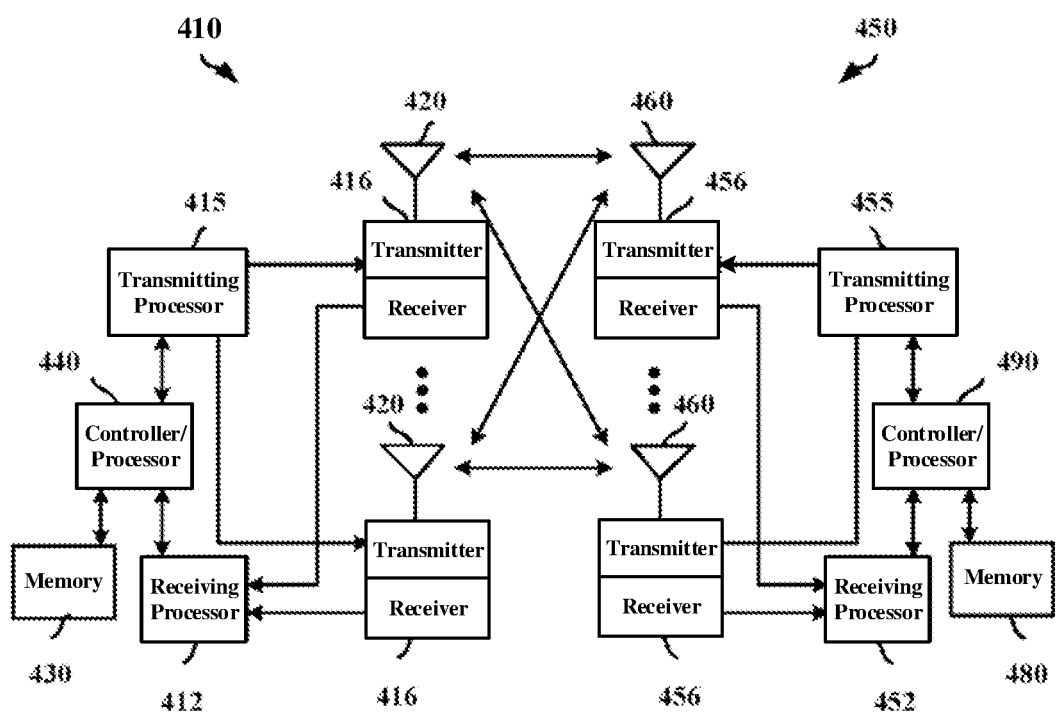
FIG. 4 is a schematic diagram of a first node device and a second node device according to an embodiment of the present application.

Embodiment 4 illustrates a schematic diagram of a first node device and a second node device according to the present application, as shown in FIG. 4.

The first node device 450 may include a controller/processor 490, a data source/buffer 480, a receiving processor 452, a transmitter/receiver 456, and a transmitting processor 455, and the transmitter/receiver 456 includes an antenna 460.

The second node device 410 may include a controller/processor 440, a data source/buffer 430, a receiving processor 412, a transmitter/receiver 416, and a transmitting processor 415, and the transmitter/receiver 416 includes an antenna 420.

During downlink (DL), an upper layer packet, such as higher-layer information included in the first information block, the second information block, and the fourth information block in the present application, is provided to the controller/processor 440. The controller/processor 440 implements functions of the L2 layer and layers above. During DL, the controller/processor 440 provides packet header compression, encryption, packet segmentation and reordering, multiplexing between a logical channel and a transport channel, and allocation to radio resources of the first node device 450 based on various priority measurements. The controller/processor 440 is further responsible for a HARQ operation, retransmission of a lost data packet, and a signaling to the first node device 450, for example, higher-layer information included in the first information block, the second information block, and the fourth information block in the present application is all generated in the controller/processor 440. The transmitting processor 415 implements various signal processing functions of the L1 layer (namely, the physical layer), including coding, interleaving, scrambling, modulation, power control/allocation, precoding, and generation of physical layer control signaling, for example, generations of physical layer signals of the first information block, the second information block, and the fourth information block in the present application are completed in the transmitting processor 415. When there is a PDCCH candidate in the M1 PDCCH candidates in the present application used for transmitting a control signaling, a generation of the transmitted control signaling is completed in the transmitting processor 415. Generated modulation symbols are split into parallel streams and each stream is mapped to a corresponding multi-carrier subcarrier and/or a multi-carrier symbol, which is then mapped by the transmitting processor 415 to an antenna 420 via the transmitter 416 for transmission as a radio frequency signal. On a receiving end, each receiver 456 receives a radio frequency signal via its corresponding antenna 460, and each receiver 456 recovers baseband information modulated onto the radio frequency carrier, and provides the baseband information to the receiving processor 452. The receiving processor 452 implements various signal reception processing functions of the L1 layer. A signal reception processing function includes a reception of physical layer signals of the first information block, the second information block, and the fourth information block in the present application, monitoring of M1 PDCCH candidates in the present application, and performing demodulation on multi-carrier symbols in a multi-carrier symbol stream based on various modulation schemes (such as Binary Phase Shift Keying (BPSK), and Quadrature Phase Shift Keying (QPSK)), then descrambling, decoding, and de-interleaving, to recover data or a control signal transmitted by the second node device 410 on a physical channel, and the data and the control signal are then provided to the controller/processor 490. The controller/processor 490 is responsible for the L2 layer and layers above, and the controller/processor 490 interprets the first information block, the second information block, and the fourth information block in the present application. The controller/processor may be associated with a memory 480 that stores program codes and data. The memory 480 may be referred to as a computer-readable medium.

During uplink (UL) transmission, the data source/buffer 480 is used to provide higher-layer data to the controller/processor 490. The data source/buffer 480 represents the L2 layer and all protocol layers above the L2 layer. The controller/processor 490 provides packet header compression, encryption, packet segmentation and reordering, and multiplexing between a logical channel and a transport channel based on radio resource allocation of the second node device 410, to implement L2 layer protocols used for the user plane and the control plane. The controller/processor 490 is further responsible for a HARQ operation, retransmission of a lost data packet, and a signaling to the second node device 410, and the third information block and the fifth information block in the present application are generated in the controller/processor 490. The transmitting processor 455 implements various signal transmission processing functions for the L1 layer (namely, the physical layer), and a physical layer signal carrying the third information block and the fifth information block is generated at the transmitting processor 455. Signal transmission processing functions include sequence generation (for signals generated by sequences), encoding, and interleaving to facilitate Forward Error Correction (FEC) at the UE 450, and modulating baseband signals (for signals generated by bit blocks) based on various modulation schemes (such as BPSK and QPSK). The signals generated by sequences or modulated symbols are split into parallel streams and each stream is mapped to a corresponding multi-carrier subcarrier and/or a multi-carrier symbol, which is then mapped by the transmitting processor 455 to an antenna 460 via the transmitter 456 for transmission as a radio frequency signal. The receiver 416 receives a radio frequency signal via its corresponding antenna 420, and each receiver 416 recovers baseband information modulated onto the radio frequency carrier, and provides the baseband information to the receiving processor 412. The receiving processor 412 implements various signal reception processing functions for the L1 layer (namely, the physical layer), including receiving and processing of a physical layer signal carrying the third information block and the fifth information block in the present application. A signal reception processing function includes obtaining a multi-carrier symbol stream, performing sequence unpacking on multi-carrier symbols in the multi-carrier symbol stream and demodulation based on various modulation schemes (such as BPSK and QPSK), then decoding and de-interleaving, to recover data and/or a control signal transmitted by the first node device 450 on a physical channel, and the data and/or the control signal are then provided to the controller/processor 440. The controller/processor 440 implements functions of the L2 layer, including reading the third information block and the fifth information block in the present application. The controller/processor may be associated with the buffer 430 that stores program codes and data. The buffer 430 may be a computer-readable medium.

In an embodiment, the first node device 450 is a UE.

In an embodiment, the first node device 450 is a user equipment that supports receiving of a multi-TRP transmission.

In an embodiment, the first node device 450 is a user equipment that supports cross-carrier scheduling.

In an embodiment, the second node device 410 is a base station device (gNB/eNB).

In an embodiment, the second node device 410 is a base station device that supports a multi-TRP transmission.

In an embodiment, the second node device 410 is a base station device that supports cross-carrier scheduling.

In an embodiment, the receiver 456 (including the antenna 460), the receiving processor 452, and the controller/processor 490 are used in the present application to receive the first information block.

In an embodiment, the receiver 456 (including the antenna 460), the receiving processor 452, and the controller/processor 490 are used in the present application to receive the second information block.

In an embodiment, the receiver 456 (including the antenna 460) and the receiving processor 452 are used in the present application to monitor the M1 PDCCH candidates.

In an embodiment, the transmitter 456 (including the antenna 460), the transmitting processor 455, and the controller/processor 490 are used in the present application to send the third information block.

In an embodiment, the receiver 456 (including the antenna 460), the receiving processor 452, and the controller/processor 490 are used in the present application to receive the fourth information block.

In an embodiment, the transmitter 456 (including the antenna 460), the transmitting processor 455, and the controller/processor 490 are used in the present application to send the fifth information block.

In an embodiment, the transmitter 416 (including the antenna 420), the transmitting processor 415, and the controller/processor 440 are used in the present application to send the first information block.

In an embodiment, the transmitter 416 (including the antenna 420), the transmitting processor 415, and the controller/processor 440 are used in the present application to send the second information block.

In an embodiment, the transmitter 416 (including the antenna 420) and the transmitting processor 415 are used to determine the M1 PDCCH candidates in the present application.

In an embodiment, the receiver 416 (including the antenna 420), the receiving processor 412, and the controller/processor 440 are used in the present application to receive the third information block.

In an embodiment, the transmitter 416 (including the antenna 420), the transmitting processor 415, and the controller/processor 440 are used in the present application to send the fourth information block.

In an embodiment, the receiver 416 (including the antenna 420), the receiving processor 412, and the controller/processor 440 are used in the present application to receive the fifth information block.

Embodiment 5

Figure 5:
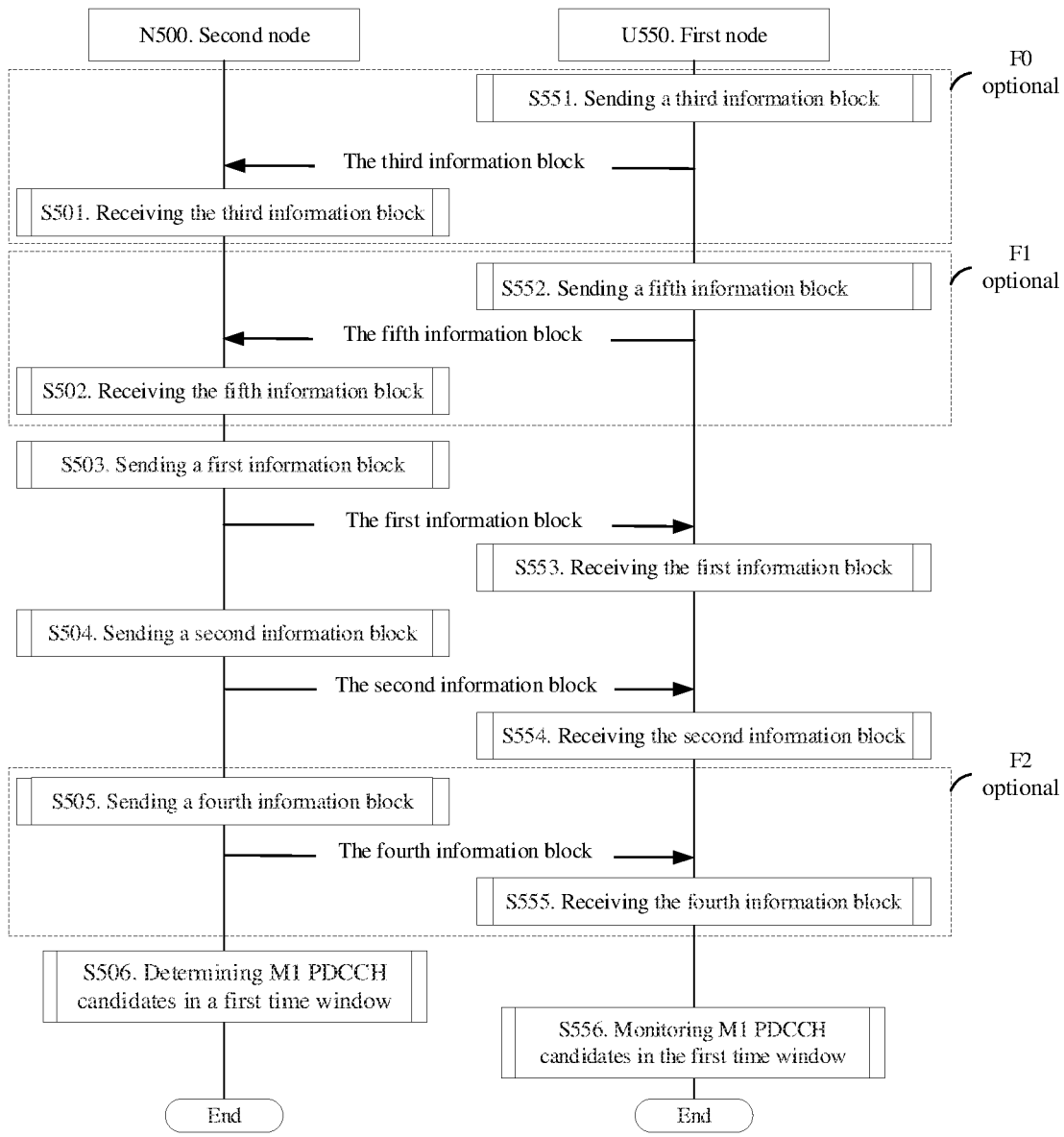
FIG. 5 is a flowchart of radio signal transmission according to an embodiment of the present application.

Embodiment 5 illustrates a flowchart of a radio signal transmission according to an embodiment of the present application, as shown in FIG. 5. In FIG. 5, a second node device N500 is a maintenance base station of a serving cell of a first node device U550, and the part circled by the dashed frame is optional. It is particularly noted that the sequence in this example does not limit the sequence of signal transmission and the sequence of implementation in the present application.

For the second node device N500, receiving a third information block in step S501, receiving a fifth information block in step S502, sending a first information block in step S503, sending a second information block in step S504, sending a fourth information block in step S505, and determining M1 PDCCH candidates in a first time window in step S506.

For the first node device U550, sending the third information block in step S551, sending the fifth information block in step S552, receiving the first information block in step S553, receiving the second information block in step S554, receiving the fourth information block in step S555, and monitoring M1 PDCCH candidates in the first time window in step S556.

In Embodiment 5, the first information block is used to determine a scheduled cell set, the scheduled cell set includes an integer quantity of serving cells greater than 1, and the second information block is used to determine M PDCCH candidates, where M is a positive integer greater than 1. The M1 PDCCH candidates occupy M2 non-overlapped CCEs, where M1 is a positive integer greater than 1, and M1 is not greater than M. Any one of the M1 PDCCH candidates is one of the M PDCCH candidates, and M2 is a positive integer greater than 1. A first threshold and a second threshold are used to determine the M1 PDCCH candidates from the M PDCCH candidates, the first threshold is a positive integer, and the second threshold is a positive integer. Serving cells included in the scheduled cell set are divided into a first cell group and a second cell group. A first serving cell is a serving cell included in the scheduled cell set, and a quantity of a control resource pool in a scheduling cell of the first serving cell is used to determine whether the first serving cell belongs to the first cell group or the second cell group. A first quantity value and a second quantity value are quantities of serving cells associated with at least one of the M1 PDCCH candidates that are included in the first cell group and the second cell group respectively. The first quantity value, the second quantity value, and a target factor are used together to determine the first threshold and the second threshold, where the target factor is a positive number. A subcarrier spacing of a subcarrier occupied by one non-overlapped CCE of the M2 non-overlapped CCEs in frequency domain is equal to a first subcarrier spacing, and the first subcarrier spacing is used to determine a time length of the first time window. The third information block is used to indicate a first candidate factor in a first candidate factor set. The fourth information block is used to determine whether the target factor is equal to the first candidate factor. The fifth information block is used to indicate the second parameter in the present application.

In an embodiment, the third information block includes all or part of a higher-layer signaling.

In an embodiment, the third information block includes all or part of a physical layer signaling.

In an embodiment, the third information block includes all or part of an RRC signaling.

In an embodiment, the third information block is transmitted through a Physical Uplink Shared Channel (PUSCH).

In an embodiment, the third information block is used to indicate a capability of the first node device in the present application.

In an embodiment, the above phrase that "the third information block is used to indicate a first candidate factor in a first candidate factor set" includes the following meaning: the third information block is used by the first node device in the present application to indicate the first candidate factor in the first candidate factor set.

In an embodiment, the above phrase that "the third information block is used to indicate a first candidate factor in a first candidate factor set" includes the following meaning: the third information block is used to explicitly indicate the first candidate factor in the first candidate factor set.

In an embodiment, the above phrase that "the third information block is used to indicate a first candidate factor in a first candidate factor set" includes the following meaning: the third information block is used to implicitly indicate the first candidate factor in the first candidate factor set.

In an embodiment, the third information block includes one or more fields in an IE "Phy-Parameters".

In an embodiment, the third information block includes a field "BDFactorR" in an IE "Phy-Parameters".

In an embodiment, the fourth information block includes all or part of a higher-layer signaling.

In an embodiment, the fourth information block includes all or part of a physical layer signaling.

In an embodiment, the fourth information block includes all or part of an RRC signaling.

In an embodiment, the fourth information block is transmitted through a PDSCH.

In an embodiment, the fourth information block is UE-specific.

In an embodiment, the fourth information block is configured per serving cell.

In an embodiment, the above phrase that "the fourth information block is used to determine whether the target factor is equal to the first candidate factor" includes the following meaning: the fourth information block is used by the first node device in the present application to determine whether the target factor is equal to the first candidate factor.

In an embodiment, the above phrase that "the fourth information block is used to determine whether the target factor is equal to the first candidate factor" includes the following meaning: the fourth information block is used to explicitly indicate whether the target factor is equal to the first candidate factor.

In an embodiment, the above phrase that "the fourth information block is used to determine whether the target factor is equal to the first candidate factor" includes the following meaning: the fourth information block is used to implicitly indicate whether the target factor is equal to the first candidate factor.

In an embodiment, the fourth information block includes a field "BDFactorR" in an IE "ControlResourceSet" in an IE "PDCCH-Config" in an RRC signaling.

In an embodiment, the fourth information block includes a field "BDFactorR" in an IE "PDCCH-Config" in an RRC signaling.

In an embodiment, the fifth information block includes all or part of a higher-layer signaling.

In an embodiment, the fifth information block includes all or part of a physical layer signaling.

In an embodiment, the fifth information block includes all or part of an RRC signaling.

In an embodiment, the fifth information block is transmitted through a PUSCH.

In an embodiment, the fifth information block is UE-specific.

In an embodiment, the fifth information block is used to indicate a capability of the first node device in the present application.

In an embodiment, the fifth information block includes an IE "Phy-Parameters".

In an embodiment, the fifth information block includes a field "pdcch-BlindDetectionCA-r16" in an IE "Phy-Parameters".

In an embodiment, the fifth information block includes a field "pdcch-BlindDetectionCA-r15" in an IE "Phy-Parameters".

In an embodiment, the above phrase that "the fifth information block is used to indicate the second parameter" includes the following meaning: the fifth information block is used by the first node device in the present application to indicate the second parameter.

In an embodiment, the above phrase that "the fifth information block is used to indicate the second parameter" includes the following meaning: the fifth information block is used to explicitly indicate the second parameter.

In an embodiment, the above phrase that "the fifth information block is used to indicate the second parameter" includes the following meaning: the fifth information block is used to implicitly indicate the second parameter.

Embodiment 6

Embodiment 6 illustrates a schematic diagram of a first cell group and a second cell group according to an embodiment of the present application, as shown in FIG. 6. In FIG. 6, the horizontal axis represents frequency, each filled block with an arc top and filled by oblique cross lines represents a serving cell included in the first cell group, and each filled block with an arc top and filled by cross lines represents a serving cell included in the second cell group.

In Embodiment 6, the first serving cell in the present application belongs to the first cell group in the present application when the quantity of a control resource pool provided in the scheduling cell of the first serving cell in the present application is equal to 1 or no control resource pool is provided in the scheduling cell of the first serving cell. The first serving cell in the present application belongs to the second cell group in the present application when the quantity of a control resource pool provided in the scheduling cell of the first serving cell in the present application is greater than 1.

In an embodiment, there is no serving cell belonging to both the first cell group and the second cell group.

In an embodiment, when one of the conditions that "the quantity of a control resource pool provided in the scheduling cell of the first serving cell is equal to 1" and "no control resource pool is provided in the scheduling cell of the first serving cell" is met, the first serving cell belongs to the first cell group.

In an embodiment, the "no control resource pool is provided in the scheduling cell of the first serving cell" includes the following meaning: there is no control resource pool index provided in the scheduling cell of the first serving cell.

In an embodiment, the "no control resource pool is provided in the scheduling cell of the first serving cell" includes the following meaning: there is no signaling of a control resource pool index provided in the scheduling cell of the first serving cell.

In an embodiment, the first serving cell belongs to one of the first cell group and the second cell group.

In an embodiment, when a control resource pool is provided in the scheduling cell of the first serving cell, a quantity of a control resource pool index provided in the scheduling cell of the first serving cell is equal to 1 or 2.

In an embodiment, when a control resource pool is provided in the scheduling cell of the first serving cell, a quantity of a control resource pool index provided in the scheduling cell of the first serving cell is equal to 1 or 2. A case "when a quantity of a control resource pool provided in the scheduling cell of the first serving cell is greater than 1" means a case that when the quantity of the control resource pool index provided in the scheduling cell of the first serving cell is equal to 2.

Embodiment 7

Embodiment 7 illustrates a schematic diagram of a relationship between M PDCCH candidates and M1 PDCCH candidates according to an embodiment of the present application, as shown in FIG. 7. In FIG. 7, each solid-line rectangle represents a PDCCH candidate in the M PDCCH candidates, each rectangle filled by oblique cross lines represents a PDCCH candidate in M1 PDCCH candidates, and each unfilled solid-line rectangle represents a PDCCH candidate other than the M1 PDCCH candidates in the M PDCCH candidates.

In Embodiment 7, when M in the present application is not greater than the first threshold in the present application and a quantity of non-overlapped CCEs occupied by the M PDCCH candidates in the present application is not greater than the second threshold in the present application, M1 is equal to M. When M is greater than the first threshold or the quantity of the non-overlapped CCEs occupied by the M PDCCH candidates is greater than the second threshold, an index of a search space set to which the M PDCCH candidates belong is used to determine the M1 PDCCH candidates from the M PDCCH candidates.

In an embodiment, the first node device in the present application drops monitoring a PDCCH candidate other than the M1 PDCCH candidates in the M PDCCH candidates.

In an embodiment, when M1 is equal to M, the M1 PDCCH candidates are the M PDCCH candidates.

In an embodiment, the above phrase that "an index of a search space set to which the M PDCCH candidates belong is used to determine the M1 PDCCH candidates from the M PDCCH candidates" includes the following meaning: the index of the search space set to which the M PDCCH candidates belong is used by the first node device in the present application to determine the M1 PDCCH candidates from the M PDCCH candidates.

In an embodiment, the above phrase that "an index of a search space set to which the M PDCCH candidates belong is used to determine the M1 PDCCH candidates from the M PDCCH candidates" includes the following meaning: the M PDCCH candidates are dropped in a size order of indexes of search space sets to which the M PDCCH candidates belong, until a quantity of remaining PDCCH candidates and a quantity of occupied non-overlapped CCEs are not greater than the first threshold and the second threshold, respectively.

In an embodiment, the above phrase that "an index of a search space set to which the M PDCCH candidates belong is used to determine the M1 PDCCH candidates from the M PDCCH candidates" includes the following meaning: an index of a search space set to which any PDCCH candidate other than the M1 PDCCH candidates in the M PDCCH candidates belongs is less than an index of a search space set to which any one of the M1 PDCCH candidates belongs.

In an embodiment, the above phrase that "an index of a search space set to which the M PDCCH candidates belong is used to determine the M1 PDCCH candidates from the M PDCCH candidates" includes the following meaning: the M PDCCH candidates are dropped in a descending order of indexes of search space sets to which the M PDCCH candidates belong, until a quantity of remaining PDCCH candidates and a quantity of occupied non-overlapped CCEs are not greater than the first threshold and the second threshold, respectively.

In an embodiment, the above phrase that "an index of a search space set to which the M PDCCH candidates belong is used to determine the M1 PDCCH candidates from the M PDCCH candidates" includes the following meaning: the M PDCCH candidates are dropped in units of search space sets and in a descending order of indexes of search space sets to which the M PDCCH candidates belong, until a quantity of remaining PDCCH candidates and a quantity of occupied non-overlapped CCEs are not greater than the first threshold and the second threshold, respectively.

Embodiment 8

Embodiment 8 illustrates a schematic diagram of a relationship between a first candidate factor and a target factor according to an embodiment of the present application, as shown in FIG. 8. In FIG. 8, each identified rectangle represents a candidate factor other than the first candidate factor in the first candidate factor set. In case A, the target factor is equal to a predefined value. In case B, the target factor is equal to the first candidate factor.

In Embodiment 8, the third information block in the present application is used to indicate a first candidate factor in a first candidate factor set. The first candidate factor set includes a positive integer quantity of candidate factors greater than 1. The first candidate factor is a candidate factor included in the first candidate factor set, and any candidate factor included in the first candidate factor set is greater than 0. The fourth information block in the present application is used to determine whether the target factor in the present application is equal to the first candidate factor. When the target factor is not equal to the first candidate factor, the target factor is equal to a predefined value.

In an embodiment, when the first node device does not send indication information of the first candidate factor, the first candidate factor is equal to a default value.

In an embodiment, the first candidate factor set is predefined and configurable.

In an embodiment, the above phrase that "the target factor is equal to a predefined value" includes the following meaning: the target factor is equal to 1.

In an embodiment, when the first node device in the present application is not provided with information on whether the target factor is equal to the first candidate factor, the target factor is equal to a predefined value.

In an embodiment, when the first node device in the present application is not provided with information on whether the target factor is equal to the first candidate factor, the target factor is equal to 1.

Embodiment 9

Embodiment 9 illustrates a schematic diagram of a target sum value and a feature sum value according to an embodiment of the present application, as shown in FIG. 9. In FIG. 9, $N_{1,\mu}$ denotes a first quantity value, $N_{2,\mu}$ denotes a second quantity value, $N_1$ denotes a quantity of serving cells associated with at least one PDCCH candidate that are included in the first cell group, $N_2$ denotes a quantity of serving cells associated with at least one PDCCH candidate that are included in the second cell group, and $\gamma$ denotes a target factor.

In Embodiment 9, a first parameter and a second parameter are used together to determine the first threshold in the present application and the second threshold in the present application, and the second parameter is a positive integer. The first parameter is equal to a ratio of a target sum value to a feature sum value, and the target sum value is not greater than the feature sum value. The feature sum value is linearly related to a quantity of serving cells associated with at least one PDCCH candidate that are included in the first cell group in the present application, and the feature sum value is linearly related to a product of the target factor and a quantity of serving cells associated with at least one PDCCH candidate that are included in the second cell group in the present application. The target sum value is linearly related to the first quantity value in the present application, and the target sum value is linearly related to a product of the second quantity value and the target factor in the present application.

In an embodiment, the target sum value is a positive integer.

In an embodiment, the target sum value is a non-negative integer.

In an embodiment, the target sum value is equal to 0.

In an embodiment, the feature sum value is a positive integer.

In an embodiment, the target sum value is less than the feature sum value.

In an embodiment, the target sum value is equal to the feature sum value.

In an embodiment, the above phrase that "the feature sum value is linearly related to a quantity of serving cells associated with at least one PDCCH candidate that are included in the first cell group" includes the following meaning: the feature sum value is linearly related to a quantity of serving cells associated with at least one PDCCH candidate in the first time window that are included in the first cell group.

In an embodiment, the above phrase that "the feature sum value is linearly related to a quantity of serving cells associated with at least one PDCCH candidate that are included in the first cell group" includes the following meaning: the feature sum value is linearly related to the quantity of serving cells associated with at least one PDCCH candidate that are included in the first cell group, and a correlation coefficient is greater than 0.

In an embodiment, the above phrase that "the feature sum value is linearly related to a quantity of serving cells associated with at least one PDCCH candidate that are included in the first cell group" includes the following meaning: the feature sum value is linearly related to the quantity of serving cells associated with at least one PDCCH candidate that are included in the first cell group, and a correlation coefficient is equal to 1.

In an embodiment, the above phrase that "the feature sum value is linearly related to a product of the target factor and a quantity of serving cells associated with at least one PDCCH candidate that are included in the second cell group" includes the following meaning: the feature sum value is linearly related to a product of the target factor and a quantity of serving cells associated with at least one PDCCH candidate in the first time window that are included in the second cell group.

In an embodiment, the above phrase that "the feature sum value is linearly related to a product of the target factor and a quantity of serving cells associated with at least one PDCCH candidate that are included in the second cell group" includes the following meaning: the feature sum value is linearly related to a product of the target factor and the quantity of serving cells associated with at least one PDCCH candidate that are included in the second cell group, and a correlation coefficient is greater than 0.

In an embodiment, the above phrase that "the feature sum value is linearly related to a product of the target factor and a quantity of serving cells associated with at least one PDCCH candidate that are included in the second cell group" includes the following meaning: the feature sum value is linearly related to the product of the target factor and the quantity of serving cells associated with at least one PDCCH candidate that are included in the second cell group, and a correlation coefficient is equal to 1.

In an embodiment, the above phrase that "the target sum value is linearly related to the first quantity value" includes the following meaning: the target sum value is linearly related to the first quantity value, and a correlation coefficient is greater than 0.

In an embodiment, the above phrase that "the target sum value is linearly related to the first quantity value" includes the following meaning: the target sum value is linearly related to the first quantity value, and a correlation coefficient is equal to 1.

In an embodiment, the above phrase that "the target sum value is linearly related to a product of the second quantity value and the target factor" includes the following meaning: the target sum value is linearly related to a product of the second quantity value and the target factor, and a correlation coefficient is greater than 0.

In an embodiment, the above phrase that "the target sum value is linearly related to a product of the second quantity value and the target factor" includes the following meaning: the target sum value is linearly related to the product of the second quantity value and the target factor, and a correlation coefficient is equal to 1.

Embodiment 10

Embodiment 10 illustrates a schematic diagram of a second parameter according to an embodiment of the present application, as shown in FIG. 10. In FIG. 10, $N_{1,cap}$ denotes a quantity of serving cells included in a first cell group, $N_{2,cap}$ denotes a quantity of serving cells included in a second cell group, and 7 denotes a target factor.

In embodiment 10, the second parameter in the present application is linearly related to a quantity of serving cells included in the first cell group in the present application, and the second parameter is linearly related to a product of the target factor in the present application and a quantity of serving cells included in the second cell group.

In an embodiment, the target factor is equal to the first candidate factor in the present application.

In an embodiment, the above phrase that "the second parameter is linearly related to a quantity of serving cells included in the first cell group" includes the following meaning: the second parameter is linearly related to the quantity of serving cells included in the first cell group, and a correlation coefficient is greater than 0.

In an embodiment, the above phrase that "the second parameter is linearly related to a quantity of serving cells included in the first cell group" includes the following meaning: the second parameter is linearly related to the quantity of serving cells included in the first cell group, and a correlation coefficient is equal to 1.

In an embodiment, the above phrase that "the second parameter is linearly related to a product of the target factor and a quantity of serving cells included in the second cell group" includes the following meaning: the second parameter is linearly related to a product of the target factor and the quantity of serving cells included in the second cell group, and a correlation coefficient is greater than 0.

In an embodiment, the above phrase that "the second parameter is linearly related to a product of the target factor and a quantity of serving cells included in the second cell group" includes the following meaning: the second parameter is linearly related to a product of the target factor and the quantity of serving cells included in the second cell group, and a correlation coefficient is equal to 1.

In an embodiment, the above phrase that "the second parameter is linearly related to a quantity of serving cells included in the first cell group, and the second parameter is linearly related to a product of the target factor and a quantity of serving cells included in the second cell group" is implemented through the following formula:

$$N_{cells}^{cap} = N_{1,cap} + R \cdot N_{2,cap}$$

where $N_{cells}^{cap}$ denotes the second parameter, $N_{1,cap}$ denotes the quantity of serving cells included in the first cell group, $N_{2,cap}$ denotes the quantity of serving cells included in the second cell group, and R denotes the target factor.

Embodiment 11

FIG. 11 illustrates a schematic diagram of a relationship between a third parameter, a fourth parameter, and a first subcarrier spacing according to an embodiment of the present application, as shown in FIG. 11. In FIG. 11, the first column from the left represents a subcarrier spacing index for scheduling, the second column from the left represents X first-type candidate parameters, and the third column from the left represents X second-type candidate parameters. The bolded subcarrier spacing index is an index of the first subcarrier spacing, the bolded first-type candidate parameter is the third parameter, and the bolded second-type candidate parameter is the fourth parameter.

In Embodiment 11, the first subcarrier spacing in the present application is a candidate subcarrier spacing in X candidate subcarrier spacings, and X is a positive integer greater than 1. The X candidate subcarrier spacings are in a one-to-one correspondence with X first-type candidate parameters respectively, and any one of the X first-type candidate parameters is a positive integer. The X candidate subcarrier spacings are in a one-to-one correspondence with X second-type candidate parameters respectively, and any one of the X second-type candidate parameters is a positive integer. The third parameter is a first-type candidate parameter of the X first-type candidate parameters, and the third parameter is used to determine the first threshold in the present application. The fourth parameter is a second-type candidate parameter of the X second-type candidate parameters, and the fourth parameter is used to determine the second threshold in the present application. The first subcarrier spacing is used to determine the third parameter from the X first-type candidate parameters, and the first subcarrier spacing is used to determine the fourth parameter from the X second-type candidate parameters.

In an embodiment, any one of the X candidate subcarrier spacings is equal to one of 15 kHz, 30 kHz, 60 kHz, and 120 kHz.

In an embodiment, X is equal to 4.

In an embodiment, X is greater than 4.

In an embodiment, any one of the X first-type candidate parameters is a maximum monitored quantity of PDCCH candidates in a slot on a serving cell.

In an embodiment, X is equal to 4, and the X first-type candidate parameters are 44, 36, 22, and 20, respectively.

In an embodiment, any one of the X first-type candidate parameters is a value of a possible $M_{PDCCH}^{max,slot,\mu}$.

In an embodiment, any one of the X second-type candidate parameters is a maximum monitored quantity of non-overlapped CCEs in a slot on a serving cell.

In an embodiment, X is equal to 4, and the X second-type candidate parameters are 56, 56, 48, and 32, respectively.

In an embodiment, any one of the X second-type candidate parameters is a value of a possible $C_{PDCCH}^{max,slot,\mu}$.

In an embodiment, the above phrase that "the X candidate subcarrier spacings are in a one-to-one correspondence with X first-type candidate parameters respectively" includes the following meaning: the X candidate subcarrier spacings are in a one-to-one correspondence with X first-type candidate parameters respectively according to a table relationship.

In an embodiment, the above phrase that "the X candidate subcarrier spacings are in a one-to-one correspondence with X first-type candidate parameters respectively" includes the following meaning: the X candidate subcarrier spacings are in a one-to-one correspondence with X first-type candidate parameters respectively according to a mapping relationship.

In an embodiment, the above phrase that "the X candidate subcarrier spacings are in a one-to-one correspondence with X second-type candidate parameters respectively" includes the following meaning: the X candidate subcarrier spacings are in a one-to-one correspondence with X second-type candidate parameters respectively according to a table relationship.

In an embodiment, the above phrase that "the X candidate subcarrier spacings are in a one-to-one correspondence with X second-type candidate parameters respectively" includes the following meaning: the X candidate subcarrier spacings are in a one-to-one correspondence with X second-type candidate parameters respectively according to a mapping relationship.

In an embodiment, the above phrase that "the third parameter is used to determine the first threshold" includes the following meaning: the third parameter is used by the first node device in the present application to determine the first threshold.

In an embodiment, the above phrase that "the third parameter is used to determine the first threshold" includes the following meaning: the first threshold is equal to a largest integer not greater than a first transformation threshold, and the first transformation threshold is proportional to the third parameter.

In an embodiment, the above phrase that "the third parameter is used to determine the first threshold" includes the following meaning: the first threshold is equal to a largest integer not greater than a first transformation threshold, the first transformation threshold is proportional to the third parameter, and a proportional coefficient between the first transformation threshold and the third parameter is equal to a product of the first parameter and the second parameter in the present application.

In an embodiment, the above phrase that "the third parameter is used to determine the first threshold" is implemented through the following formula:

$$M_{PDCCH}^{total,slot,\mu} = \lfloor N_{cells}^{cap} \cdot M_{PDCCH}^{max,slot,\mu} \cdot P_{cells}^{DL,\mu} \rfloor$$

where $M_{PDCCH}^{total,slot,\mu}$ denotes the first threshold, $P_{cells}^{DL,\mu}$ denotes the first parameter in the present application, $N_{cells}^{cap}$ denotes the second parameter in the present application, $M_{PDCCH}^{max,slot,\mu}$ denotes the third parameter, and μ denotes the index of the first subcarrier spacing.

In an embodiment, the above phrase that "the fourth parameter is used to determine the second threshold" includes the following meaning: the fourth parameter is used by the first node device in the present application to determine the second threshold.

In an embodiment, the above phrase that "the fourth parameter is used to determine the second threshold" includes the following meaning: the second threshold is equal to a largest integer not greater than a second transformation threshold, and the second transformation threshold is proportional to the fourth parameter.

In an embodiment, the above phrase that "the fourth parameter is used to determine the second threshold" includes the following meaning: the second threshold is equal to a largest integer not greater than a second transformation threshold, the second transformation threshold is proportional to the fourth parameter, and a proportional coefficient between the second transformation threshold and the fourth parameter is equal to a product of the first parameter and the second parameter in the present application.

In an embodiment, the above phrase that "the fourth parameter is used to determine the second threshold" is implemented through the following formula:

$$C_{PDCCH}^{total,slot,\mu} = \lfloor N_{cells}^{cap} \cdot C_{PDCCH}^{max,slot,\mu} \cdot P_{cells}^{DL,\mu} \rfloor$$

where $C_{PDCCH}^{total,slot,\mu}$, denotes the second threshold, $P_{cells}^{DL,\mu}$ denotes the first parameter in the present application, $N_{cells}^{cap}$ denotes the second parameter in the present application, $C_{PDCCH}^{max,slot,\mu}$ denotes the fourth parameter, and μ denotes the index of the first subcarrier spacing.

In an embodiment, the above phrase that "the first subcarrier spacing is used to determine the third parameter from the X first-type candidate parameters" includes the following meaning: the first subcarrier spacing is used by the first node device in the present application to determine the third parameter from the X first-type candidate parameters.

In an embodiment, the above phrase that "the first subcarrier spacing is used to determine the third parameter from the X first-type candidate parameters" includes the following meaning: the third parameter is a first-type candidate parameter corresponding to the first subcarrier spacing of the X first-type candidate parameters.

In an embodiment, the above phrase that "the first subcarrier spacing is used to determine the fourth parameter from the X second-type candidate parameters" includes the following meaning: the first subcarrier spacing is used by the first node device in the present application to determine the fourth parameter from the X second-type candidate parameters.

In an embodiment, the above phrase that "the first subcarrier spacing is used to determine the fourth parameter from the X second-type candidate parameters" includes the following meaning: the fourth parameter is a second-type candidate parameter corresponding to the first subcarrier spacing of the X second-type candidate parameters.

Embodiment 12

Embodiment 12 illustrates a schematic diagram of BWPs in a first BWP set according to an embodiment of the present application, as shown in FIG. 12. In FIG. 12, the horizontal axis represents frequency, each block-shaped area having an arc top represents a serving cell, the two dashed frames represent a scheduled cell set and a scheduling cell set respectively, and each vertical bar filled with oblique cross lines represents a subcarrier included in a BWP that is included in the first BWP set.

In Embodiment 12, the scheduling cell set includes a scheduling cell of serving cells included in the scheduled cell set in the present application, and the scheduling cell set includes a positive integer quantity of serving cells. The M1 PDCCH candidates in the present application are monitored in a BWP included in a first BWP set, and the first BWP set includes a positive integer quantity of BWPs. A serving cell to which any BWP included in the first BWP set belongs in frequency domain belongs to the scheduling cell set. A subcarrier spacing of a subcarrier included in any BWP that is included in the first BWP set is equal to the first subcarrier spacing.

In an embodiment, any serving cell included in the scheduling cell set is an activated cell.

In an embodiment, the scheduling cell set includes a serving cell that is a deactivated cell.

In an embodiment, a quantity of serving cells included in the scheduling cell set is equal to a quantity of BWPs included in the first BWP set.

In an embodiment, the above phrase that "the scheduling cell set includes a scheduling cell of serving cells included in the scheduled cell set," includes the following meaning: the scheduling cell set includes all scheduling cells of serving cells included in the scheduled cell set.

In an embodiment, the above phrase that "the scheduling cell set includes a scheduling cell of serving cells included in the scheduled cell set," includes the following meaning: any serving cell scheduled by the serving cells included in the scheduling cell set belongs to the scheduled cell set.

In an embodiment, the above phrase that "the scheduling cell set includes a scheduling cell of serving cells included in the scheduled cell set," includes the following meaning: the scheduling cell set includes a scheduling cell of any serving cell included in the scheduled cell set.

In an embodiment, the above phrase that "the M1 PDCCH candidates are monitored in a BWP included in a first BWP set" includes the following meaning: a BWP to which a frequency domain resource occupied by any one of the M1 PDCCH candidates belongs to the first BWP set.

In an embodiment, the above phrase that "the M1 PDCCH candidates are monitored in a BWP included in a first BWP set" includes the following meaning: a BWP in the first BWP set includes a frequency domain resource occupied by any one of the M1 PDCCH candidates.

In an embodiment, any BWP included in the first BWP set is an active downlink bandwidth part (Active DL BWP).

In an embodiment, a serving cell to which any BWP included in the first BWP set belongs is a serving cell corresponding to a carrier to which any BWP included in the first BWP set belongs.

In an embodiment, when the first BWP set includes more than one BWP, any two BWPs included in the first BWP set belong to two different serving cells, respectively.

In an embodiment, a BWP to which any one of the M2 CCEs belongs in frequency domain is a BWP in the first BWP set.

In an embodiment, the method further includes:
receiving a sixth information block, where
the sixth information block is used to determine each BWP in the first BWP set and a subcarrier spacing of a subcarrier of each BWP in the first BWP set.

In an embodiment, the above phrase that "a serving cell to which any BWP included in the first BWP set belongs in frequency domain belongs to the scheduling cell set." includes the following meaning: the scheduling cell set includes a serving cell to which any BWP included in the first BWP set belongs in frequency domain.

In an embodiment, the above phrase that "a serving cell to which any BWP included in the first BWP set belongs in frequency domain belongs to the scheduling cell set." includes the following meaning: the scheduling cell set includes only the serving cell to which a BWP included in the first BWP set belongs in frequency domain.

In an embodiment, the above phrase that "a serving cell to which any BWP included in the first BWP set belongs in frequency domain belongs to the scheduling cell set." includes the following meaning: the first BWP set includes B BWPs, the scheduling cell set includes B serving cells, and the B serving cells include the B BWPs respectively, where B is a positive integer.

In an embodiment, a subcarrier spacing of any subcarrier included in any BWP that is included in the first BWP set is equal to the first subcarrier spacing.

Embodiment 13

Embodiment 13 illustrates a structural block diagram of a processing apparatus in a first node device according to an embodiment, as shown in FIG. 13. In FIG. 13, a processing apparatus 1300 in a first node device includes a first transceiver 1301 and a first receiver 1302. The first transceiver 1301 includes the transmitter/receiver 456 (including the antenna 460), the transmitting processor 455, the receiving processor 452, and the controller/processor 490 in FIG. 4 of the present application. The first receiver 1302 includes the transmitter/receiver 456 (including the antenna 460), the receiving processor 452, and the controller/processor 490 in FIG. 4 of the present application.

In Embodiment 13, the first transceiver 1301 is configured to receive a first information block and a second information block. The first information block is used to determine a scheduled cell set, and the scheduled cell set includes an integer quantity of serving cells greater than 1. The second information block is used to determine M PDCCH candidates, where M is a positive integer greater than 1. The first receiver 1302 is configured to monitor M1 PDCCH candidates in a first time window, where the M1 PDCCH candidates occupy M2 non-overlapped CCEs, M1 is a positive integer greater than 1, and M1 is not greater than M. Any one of the M1 PDCCH candidates is one of the M PDCCH candidates, and M2 is a positive integer greater than 1. A first threshold and a second threshold are used to determine the M1 PDCCH candidates from the M PDCCH candidates, the first threshold is a positive integer, and the second threshold is a positive integer. Serving cells included in the scheduled cell set are divided into a first cell group and a second cell group. A first serving cell is a serving cell included in the scheduled cell set, and a quantity of a control resource pool in a scheduling cell of the first serving cell is used to determine whether the first serving cell belongs to the first cell group or the second cell group. A first quantity value and a second quantity value are quantities of serving cells associated with at least one of the M1 PDCCH candidates that are included in the first cell group and the second cell group respectively, and the first quantity value, the second quantity value, and a target factor are used together to determine the first threshold and the second threshold, where the target factor is a positive number. A subcarrier spacing of a subcarrier occupied by one non-overlapped CCE of the M2 non-overlapped CCEs in frequency domain is equal to a first subcarrier spacing, and the first subcarrier spacing is used to determine a time length of the first time window.

In an embodiment, the first serving cell belongs to the first cell group when the quantity of the control resource pool provided in the scheduling cell of the first serving cell is equal to 1 or no control resource pool is provided in the scheduling cell of the first serving cell. The first serving cell belongs to the second cell group when the quantity of the control resource pool provided in the scheduling cell of the first serving cell is greater than 1.

In an embodiment, M1 is equal to M when M is not greater than the first threshold and a quantity of a non-overlapped CCE occupied by the M PDCCH candidates is not greater than the second threshold. An index of a search space set to which the M PDCCH candidates belong is used to determine the M1 PDCCH candidates from the M PDCCH candidates when M is greater than the first threshold or the quantity of the non-overlapped CCE occupied by the M PDCCH candidates is greater than the second threshold.

In an embodiment, the first transceiver 1301 sends a third information block, and the first transceiver 1301 receives a fourth information block. The third information block is used to indicate a first candidate factor in a first candidate factor set, and the first candidate factor set includes a positive integer quantity of candidate factors greater than 1. The first candidate factor is a candidate factor included in the first candidate factor set, and any candidate factor included in the first candidate factor set is greater than 0. The fourth information block is used to determine whether the target factor is equal to the first candidate factor. The target factor is equal to a predefined value when the target factor is not equal to the first candidate factor.

In an embodiment, a first parameter and a second parameter are used together to determine the first threshold and the second threshold, and the second parameter is a positive integer. The first parameter is equal to a ratio of a target sum value to a feature sum value, and the target sum value is not greater than the feature sum value. The feature sum value is linearly related to a quantity of serving cells associated with at least one PDCCH candidate that are included in the first cell group, and the feature sum value is linearly related to a product of the target factor and a quantity of serving cells associated with at least one PDCCH candidate that are included in the second cell group. The target sum value is linearly related to the first quantity value, and the target sum value is linearly related to a product of the second quantity value and the target factor.

In an embodiment, the first transceiver 1301 sends a fifth information block, and the fifth information block is used to indicate the second parameter; or the second parameter is linearly related to a quantity of serving cells included in the first cell group, and the second parameter is linearly related to a product of the target factor and a quantity of serving cells included in the second cell group.

In an embodiment, the first subcarrier spacing is a candidate subcarrier spacing in X candidate subcarrier spacings, and X is a positive integer greater than 1. The X candidate subcarrier spacings are in a one-to-one correspondence with X first-type candidate parameters respectively, and any one of the X first-type candidate parameters is a positive integer. The X candidate subcarrier spacings are in a one-to-one correspondence with X second-type candidate parameters respectively, and any one of the X second-type candidate parameters is a positive integer. A third parameter is a first-type candidate parameter of the X first-type candidate parameters, and the third parameter is used to determine the first threshold. A fourth parameter is a second-type candidate parameter of the X second-type candidate parameters, and the fourth parameter is used to determine the second threshold. The first subcarrier spacing is used to determine the third parameter from the X first-type candidate parameters, and the first subcarrier spacing is used to determine the fourth parameter from the X second-type candidate parameters.

In an embodiment, the scheduling cell set includes a scheduling cell of serving cells included in the scheduled cell set, and the scheduling cell set includes a positive integer quantity of serving cells. The M1 PDCCH candidates are monitored in a BWP included in a first BWP set, and the first BWP set includes a positive integer quantity of BWPs. A serving cell to which any BWP included in the first BWP set belongs in frequency domain belongs to the scheduling cell set. A subcarrier spacing of a subcarrier included in any BWP that is included in the first BWP set is equal to the first subcarrier spacing.

Embodiment 14

Figure 14:
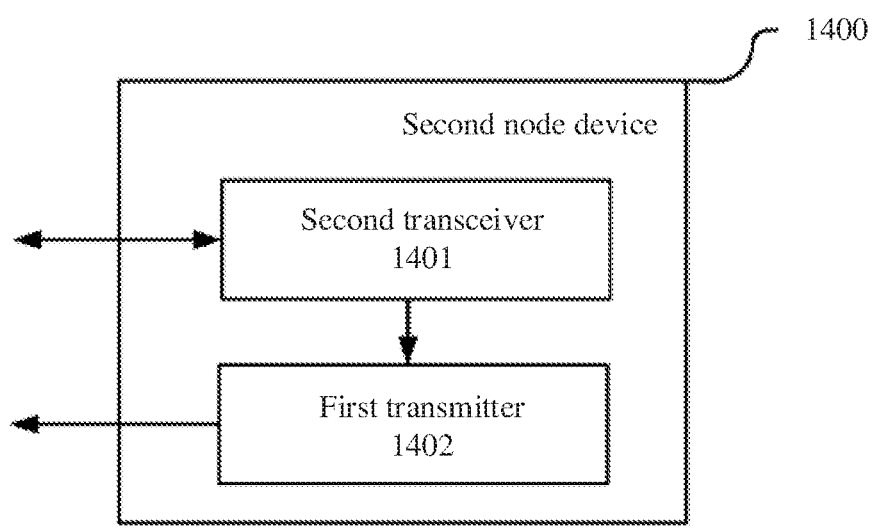
FIG. 14 is a structural block diagram of a processing apparatus in a second node device according to an embodiment of the present application.

Embodiment 14 illustrates a structural block diagram of a processing apparatus in a second node device according to an embodiment, as shown in FIG. 14. In FIG. 14, a processing apparatus 1400 in a second node device includes a second transceiver 1401 and a first transmitter 1402. The second transceiver 1401 includes the transmitter/receiver 416 (including the antenna 420), the receiving processor 412, the transmitting processor 415, and the controller/processor 440 in FIG. 4 of the present application. The first transmitter 1402 includes the transmitter/receiver 416 (including the antenna 420), the transmitting processor 415, and the controller/processor 440 in FIG. 4 of the present application.

In embodiment 14, the second transceiver 1401 is configured to send a first information block and a second information block, the first information block is used to indicate a scheduled cell set, and the scheduled cell set includes an integer quantity of serving cells greater than 1. The second information block is used to indicate M PDCCH candidates, where M is a positive integer greater than 1. The first transmitter 1402 is configured to determine M1 PDCCH candidates in a first time window, where the M1 PDCCH candidates occupy M2 non-overlapped CCEs, M1 is a positive integer greater than 1, and M1 is not greater than M. Any one of the M1 PDCCH candidates is one of the M PDCCH candidates, and M2 is a positive integer greater than 1. A first threshold and a second threshold are used to determine the M1 PDCCH candidates from the M PDCCH candidates, the first threshold is a positive integer, and the second threshold is a positive integer. Serving cells included in the scheduled cell set are divided into a first cell group and a second cell group. A first serving cell is a serving cell included in the scheduled cell set, and a quantity of a control resource pool in a scheduling cell of the first serving cell is used to determine whether the first serving cell belongs to the first cell group or the second cell group. A first quantity value and a second quantity value are quantities of serving cells associated with at least one of the M1 PDCCH candidates that are included in the first cell group and the second cell group respectively. The first quantity value, the second quantity value, and a target factor are used together to determine the first threshold and the second threshold, where the target factor is a positive number. A subcarrier spacing of a subcarrier occupied by one non-overlapped CCE of the M2 non-overlapped CCEs in frequency domain is equal to a first subcarrier spacing, and the first subcarrier spacing is used to determine a time length of the first time window.

In an embodiment, the first serving cell belongs to the first cell group when the quantity of the control resource pool provided in the scheduling cell of the first serving cell is equal to 1 or no control resource pool is provided in the scheduling cell of the first serving cell. The first serving cell belongs to the second cell group when the quantity of the control resource pool provided in the scheduling cell of the first serving cell is greater than 1.

In an embodiment, M1 is equal to M when M is not greater than the first threshold and a quantity of a non-overlapped CCE occupied by the M PDCCH candidates is not greater than the second threshold. An index of a search space set to which the M PDCCH candidates belong is used to determine the M1 PDCCH candidates from the M PDCCH candidates when M is greater than the first threshold or the quantity of the non-overlapped CCE occupied by the M PDCCH candidates is greater than the second threshold.

In an embodiment, the second transceiver 1401 receives a third information block, and the second transceiver 1401 sends a fourth information block. The third information block is used to indicate a first candidate factor in a first candidate factor set, and the first candidate factor set includes a positive integer quantity of candidate factors greater than 1. The first candidate factor is a candidate factor included in the first candidate factor set, and any candidate factor included in the first candidate factor set is greater than 0. The fourth information block is used to indicate whether the target factor is equal to the first candidate factor. The target factor is equal to a predefined value when the target factor is not equal to the first candidate factor.

In an embodiment, a first parameter and a second parameter are used together to determine the first threshold and the second threshold, and the second parameter is a positive integer. The first parameter is equal to a ratio of a target sum value to a feature sum value, and the target sum value is not greater than the feature sum value. The feature sum value is linearly related to a quantity of serving cells associated with at least one PDCCH candidate that are included in the first cell group, and the feature sum value is linearly related to a product of the target factor and a quantity of serving cells associated with at least one PDCCH candidate that are included in the second cell group. The target sum value is linearly related to the first quantity value, and the target sum value is linearly related to a product of the second quantity value and the target factor.

In an embodiment, the second transceiver 1401 receives a fifth information block, and the fifth information block is used to indicate the second parameter; or the second parameter is linearly related to a quantity of serving cells included in the first cell group, and the second parameter is linearly related to a product of the target factor and a quantity of serving cells included in the second cell group.

In an embodiment, the first subcarrier spacing is a candidate subcarrier spacing in X candidate subcarrier spacings, and X is a positive integer greater than 1. The X candidate subcarrier spacings are in a one-to-one correspondence with X first-type candidate parameters respectively, and any one of the X first-type candidate parameters is a positive integer. The X candidate subcarrier spacings are in a one-to-one correspondence with X second-type candidate parameters respectively, and any one of the X second-type candidate parameters is a positive integer. A third parameter is a first-type candidate parameter of the X first-type candidate parameters, and the third parameter is used to determine the first threshold. A fourth parameter is a second-type candidate parameter of the X second-type candidate parameters, and the fourth parameter is used to determine the second threshold. The first subcarrier spacing is used to determine the third parameter from the X first-type candidate parameters, and the first subcarrier spacing is used to determine the fourth parameter from the X second-type candidate parameters.

In an embodiment, the scheduling cell set includes a scheduling cell of serving cells included in the scheduled cell set, and the scheduling cell set includes a positive integer quantity of serving cells. The M1 PDCCH candidates are monitored in a BWP included in a first BWP set, and the first BWP set includes a positive integer quantity of BWPs. A serving cell to which any BWP included in the first BWP set belongs in frequency domain belongs to the scheduling cell set. A subcarrier spacing of a subcarrier included in any BWP that is included in the first BWP set is equal to the first subcarrier spacing.

Those of ordinary skill in the art may understand that all or some of the steps in the foregoing method may be completed by instructing relevant hardware through a program, and the program may be stored in a computer-readable storage medium, such as a read-only memory, a hard disk or an optical disk. Optionally, all or some of the steps in the foregoing embodiments may alternatively be implemented by using one or more integrated circuits. Correspondingly, each module unit in the foregoing embodiments may be implemented in a form of hardware, or may be implemented in a form of a software function module, and the present application is not limited to any specific form of combination of software and hardware. The first node device, second node device, UE, or terminal in the present application includes but is not limited to wireless communication devices such as a mobile phone, a tablet computer, a notebook, a prepaid Internet card, a low-power device, an eMTC device, an NB-IoT device, an in-vehicle communications device, an aircraft, an airplane, an unmanned aerial vehicle, and a remote control aircraft. The base station device, base station, or network side device in the present application includes, but is not limited to, wireless communication devices such as a macro cell base station, a micro cell base station, a home base station, a relay base station, an eNB, a gNB, a transmission reception point (TRP), a relay satellite, a satellite base station, and an air base station.

The foregoing descriptions are merely preferred embodiments of the present application, rather than limiting the protection scope of the present application. Any modification, equivalent replacement, or improvement made without departing from the spirit and principle of the present application shall fall within the protection scope of the present application.

What is claimed is:

1. A first node device used for wireless communication, comprising:
    a first transceiver, configured to receive a first information block and a second information block, wherein the first information block is used to determine a scheduled cell set, the scheduled cell set comprises an integer quantity of serving cells greater than 1, and the second information block is used to determine M Physical Downlink Control Channel (PDCCH) candidates, M is a positive integer greater than 1; and
    a first receiver, configured to monitor M1 PDCCH candidates in a first time window, wherein the M1 PDCCH candidates occupy M2 non-overlapped Control Channel Elements (CCEs), M1 is a positive integer greater than 1, M1 is not greater than M, any one of the M1 PDCCH candidates is one of the M PDCCH candidates, and M2 is a positive integer greater than 1; and
    wherein a first threshold and a second threshold are used to determine the M1 PDCCH candidates from the M PDCCH candidates, the first threshold is a positive integer, and the second threshold is a positive integer; serving cells comprised in the scheduled cell set are divided into a first cell group and a second cell group, a first serving cell is a serving cell comprised in the scheduled cell set, and a quantity of a control resource pool in a scheduling cell of the first serving cell is used to determine whether the first serving cell belongs to the first cell group or the second cell group; a first quantity value and a second quantity value are quantities of serving cells associated with at least one of the M1 PDCCH candidates that are comprised in the first cell group and the second cell group respectively, the first quantity value, the second quantity value, and a target factor are used together to determine the first threshold and the second threshold, and the target factor is a positive number; and a subcarrier spacing of a subcarrier occupied by one non-overlapped CCE of the M2 non-overlapped CCEs in frequency domain is equal to a first subcarrier spacing, and the first subcarrier spacing is used to determine a time length of the first time window.

2. The first node device according to claim 1, wherein the first serving cell belongs to the first cell group when the quantity of the control resource pool provided in the scheduling cell of the first serving cell is equal to 1 or no control resource pool is provided in the scheduling cell of the first serving cell, and the first serving cell belongs to the second cell group when the quantity of the control resource pool provided in the scheduling cell of the first serving cell is greater than 1.

3. The first node device according to claim 1, wherein M1 is equal to M when M is not greater than the first threshold and a quantity of a non-overlapped CCE occupied by the M PDCCH candidates is not greater than the second threshold; an index of a search space set to which the M PDCCH candidates belong is used to determine the M1 PDCCH candidates from the M PDCCH candidates when M is greater than the first threshold or the quantity of the non-overlapped CCE occupied by the M PDCCH candidates is greater than the second threshold.

4. The first node device according to claim 1, wherein the first transceiver sends a third information block, and the first transceiver receives a fourth information block; the third information block is used to indicate a first candidate factor in a first candidate factor set, the first candidate factor set comprises a positive integer quantity of candidate factors greater than 1, the first candidate factor is a candidate factor comprised in the first candidate factor set, and any candidate factor comprised in the first candidate factor set is greater than 0; the fourth information block is used to determine whether the target factor is equal to the first candidate factor; and the target factor is equal to a predefined value when the target factor is not equal to the first candidate factor.

5. The first node device according to claim 1, wherein a first parameter and a second parameter are used together to determine the first threshold and the second threshold, and the second parameter is a positive integer; the first parameter is equal to a ratio of a target sum value to a feature sum value, and the target sum value is not greater than the feature sum value; the feature sum value is linearly related to a quantity of serving cells associated with at least one PDCCH candidate that are comprised in the first cell group, and the feature sum value is linearly related to a product of the target factor and a quantity of serving cells associated with at least one PDCCH candidate that are comprised in the second cell group; and the target sum value is linearly related to the first quantity value, and the target sum value is linearly related to a product of the second quantity value and the target factor.

6. The first node device according to claim 5, wherein the first transceiver sends a fifth information block, and the fifth information block is used to indicate the second parameter; or
the second parameter is linearly related to a quantity of serving cells comprised in the first cell group, and the second parameter is linearly related to a product of the target factor and a quantity of serving cells comprised in the second cell group.

7. The first node device according to claim 1, wherein the first subcarrier spacing is a candidate subcarrier spacing in X candidate subcarrier spacings, and X is a positive integer greater than 1; the X candidate subcarrier spacings are in a one-to-one correspondence with X first-type candidate parameters respectively, any one of the X first-type candidate parameters is a positive integer, the X candidate subcarrier spacings are in a one-to-one correspondence with X second-type candidate parameters respectively, and any one of the X second-type candidate parameters is a positive integer; a third parameter is a first-type candidate parameter of the X first-type candidate parameters, and the third parameter is used to determine the first threshold; a fourth parameter is a second-type candidate parameter of the X second-type candidate parameters, and the fourth parameter is used to determine the second threshold; and the first subcarrier spacing is used to determine the third parameter from the X first-type candidate parameters, and the first subcarrier spacing is used to determine the fourth parameter from the X second-type candidate parameters.

8. The first node device according to claim 1, wherein a scheduling cell set comprises a scheduling cell of the serving cells comprised in the scheduled cell set, and the scheduling cell set comprises a positive integer quantity of serving cells; the M1 PDCCH candidates are monitored in a Bandwidth Part (BWP) comprised in a first BWP set, and the first BWP set comprises a positive integer quantity of BWPs; a serving cell to which any BWP comprised in the first BWP set belongs in frequency domain belongs to the scheduling cell set; and a subcarrier spacing of a subcarrier comprised in any BWP that is comprised in the first BWP set is equal to the first subcarrier spacing.

9. A second node device used for wireless communication, comprising:
a second transceiver, configured to send a first information block and a second information block, wherein the first information block is used to indicate a scheduled cell set, the scheduled cell set comprises an integer quantity of serving cells greater than 1, and the second information block is used to indicate M PDCCH candidates, M is a positive integer greater than 1; and
a first transmitter, configured to determine M1 PDCCH candidates in a first time window, wherein the M1 PDCCH candidates occupy M2 non-overlapped CCEs, M1 is a positive integer greater than 1, M1 is not greater than M, any one of the M1 PDCCH candidates is one of the M PDCCH candidates, and M2 is a positive integer greater than 1; and
wherein a first threshold and a second threshold are used to determine the M1 PDCCH candidates from the M PDCCH candidates, the first threshold is a positive integer, and the second threshold is a positive integer; serving cells comprised in the scheduled cell set are divided into a first cell group and a second cell group, a first serving cell is a serving cell comprised in the scheduled cell set, and a quantity of a control resource pool in a scheduling cell of the first serving cell is used to determine whether the first serving cell belongs to the first cell group or the second cell group; a first quantity value and a second quantity value are quantities of serving cells associated with at least one of the M1 PDCCH candidates that are comprised in the first cell group and the second cell group respectively, the first quantity value, the second quantity value, and a target factor are used together to determine the first threshold and the second threshold, and the target factor is a positive number; and a subcarrier spacing of a subcarrier occupied by one non-overlapped CCE of the M2 non-overlapped CCEs in frequency domain is equal to a first subcarrier spacing, and the first subcarrier spacing is used to determine a time length of the first time window.

10. A method for a first node used for wireless communication, comprising:
receiving a first information block and a second information block, wherein the first information block is used to determine a scheduled cell set, the scheduled cell set comprises an integer quantity of serving cells greater than 1, and the second information block is used to determine M PDCCH candidates, M is a positive integer greater than 1; and
monitoring M1 PDCCH candidates in a first time window, wherein the M1 PDCCH candidates occupy M2 non-overlapped CCEs, M1 is a positive integer greater than 1, M1 is not greater than M, any one of the M1 PDCCH candidates is one of the M PDCCH candidates, and M2 is a positive integer greater than 1, and
wherein a first threshold and a second threshold are used to determine the M1 PDCCH candidates from the M PDCCH candidates, the first threshold is a positive integer, and the second threshold is a positive integer; serving cells comprised in the scheduled cell set are divided into a first cell group and a second cell group, a first serving cell is a serving cell comprised in the scheduled cell set, and a quantity of a control resource pool in a scheduling cell of the first serving cell is used to determine whether the first serving cell belongs to the first cell group or the second cell group; a first quantity value and a second quantity value are quantities of serving cells associated with at least one of the M1 PDCCH candidates that are comprised in the first cell group and the second cell group respectively, the first quantity value, the second quantity value, and a target factor are used together to determine the first threshold and the second threshold, and the target factor is a positive number; and a subcarrier spacing of a subcarrier occupied by one non-overlapped CCE of the M2 non-overlapped CCEs in frequency domain is equal to a first subcarrier spacing, and the first subcarrier spacing is used to determine a time length of the first time window.

11. A method for a second node used for wireless communication, comprising:
sending a first information block and a second information block, wherein the first information block is used to indicate a scheduled cell set, the scheduled cell set comprises an integer quantity of serving cells greater than 1, and the second information block is used to indicate M PDCCH candidates, M is a positive integer greater than 1; and
determining M1 PDCCH candidates in a first time window, wherein the M1 PDCCH candidates occupy M2 non-overlapped CCEs, M1 is a positive integer greater than 1, M1 is not greater than M, any one of the M1

PDCCH candidates is one of the M PDCCH candidates, and M2 is a positive integer greater than 1; and wherein a first threshold and a second threshold are used to determine the M1 PDCCH candidates from the M PDCCH candidates, the first threshold is a positive integer, and the second threshold is a positive integer; serving cells comprised in the scheduled cell set are divided into a first cell group and a second cell group, a first serving cell is a serving cell comprised in the scheduled cell set, and a quantity of a control resource pool in a scheduling cell of the first serving cell is used to determine whether the first serving cell belongs to the first cell group or the second cell group; a first quantity value and a second quantity value are quantities of serving cells associated with at least one of the M1 PDCCH candidates that are comprised in the first cell group and the second cell group respectively, the first quantity value, the second quantity value, and a target factor are used together to determine the first threshold and the second threshold, and the target factor is a positive number; and a subcarrier spacing of a subcarrier occupied by one non-overlapped CCE of the M2 non-overlapped CCEs in frequency domain is equal to a first subcarrier spacing, and the first subcarrier spacing is used to determine a time length of the first time window.

* * * * *